US012750858B2

(12) United States Patent
Barak et al.

(10) Patent No.: US 12,750,858 B2
(45) Date of Patent: Sep. 29, 2026

(54) ADAPTIVE QUANTIZATION PROCEDURES FOR CHANNEL TRACKING REFERENCE SIGNALS TO SUPPORT TRANSMISSION PRE-EQUALIZATION-BASED SYSTEMS

(71) Applicant: QUALCOMM Incorporated, San Diego, CA (US)

(72) Inventors: Tom Barak, Rehovot (IL); Michael Levitsky, Rehovot (IL); Daniel Paz, Atlit (IL); Alexander Sverdlov, Rehovot (IL)

(73) Assignee: QUALCOMM Incorporated, San Diego, CA (US)

(*) Notice: Subject to any disclaimer, the term of this patent is extended or adjusted under 35 U.S.C. 154(b) by 442 days.

(21) Appl. No.: 18/241,088

(22) Filed: Aug. 31, 2023

(65) Prior Publication Data

US 2025/0081208 A1 Mar. 6, 2025

(51) Int. Cl.

*H04W 72/231* (2023.01)
*H04L 5/00* (2006.01)
*H04W 72/0453* (2023.01)
*H04W 72/541* (2023.01)

(52) U.S. Cl.

CPC ......... *H04W 72/231* (2023.01); *H04L 5/0051* (2013.01); *H04W 72/0453* (2013.01); *H04W 72/541* (2023.01)

(58) Field of Classification Search

CPC ........... H04W 72/231; H04W 72/0453; H04W 72/541; H04W 72/40; H04W 56/001; H04W 56/0045; H04W 56/0015; H04L 5/0051; H04L 25/03343; H04L 25/0224; H04L 25/03006; H04B 7/15

See application file for complete search history.

(56) References Cited

U.S. PATENT DOCUMENTS 11,539,417 B2 * 12/2022 Chung .................. H04W 72/56
12,170,561 B2 * 12/2024 Chung ................. H04B 7/0478
2010/0002797 A1 1/2010 Sanayei
2025/0007582 A1 * 1/2025 Jo ........................ H04B 7/0626
2025/0081129 A1 3/2025 Paz et al.
2025/0097079 A1 3/2025 Barak et al.

FOREIGN PATENT DOCUMENTS

WO 2022159222 A1 7/2022

OTHER PUBLICATIONS

International Search Report and Written Opinion—PCT/US2024/038482—ISA/EPO—Nov. 7, 2024, 13 pages.

(Continued)

*Primary Examiner* — Brian T O'Connor

(74) *Attorney, Agent, or Firm* — Procopio, Cory, Hargreaves & Savitch LLP

(57) ABSTRACT

A wireless device receives control signaling from a user equipment (UE) indicating one or more quantization scheme parameters. The wireless device measures a downlink reference signal from the UE based on the one or more quantization scheme parameters and reports, to the UE, quantized sampling information based on measurement of the downlink reference signal from the UE. The wireless device receives one or more equalized data transmissions from the UE after providing the quantized sampling information to the UE.

30 Claims, 18 Drawing Sheets

(56) References Cited

OTHER PUBLICATIONS

Qualcomm Incorporated: "Power Saving Techniques for XR", 3GPP TSG RAN WG1 #110, R1-2207253, 3rd Generation Partnership Project (3GPP), Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, XP052275189, 33 Pages, the whole document.

* cited by examiner

ADAPTIVE QUANTIZATION PROCEDURES FOR CHANNEL TRACKING REFERENCE SIGNALS TO SUPPORT TRANSMISSION PRE-EQUALIZATION-BASED SYSTEMS

TECHNICAL FIELD

The present disclosure relates generally to communication systems, and more particularly, to wireless communication employing extended reality (XR) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a wireless device. The apparatus receives control signaling from a user equipment (UE) indicating one or more quantization scheme parameters. The wireless device measures a downlink reference signal from the UE based on the one or more quantization scheme parameters and reports, to the UE, quantized sampling information based on measurement of the downlink reference signal from the UE. The wireless device receives one or more equalized data transmissions from the UE after providing the quantized sampling information to the UE.

In an aspect of the disclosure, a method, a computer-readable medium, and an apparatus are provided for wireless communication at a UE. The apparatus transmits control signaling to a wireless device, the control signaling indicating one or more quantization scheme parameters. The apparatus transmits a downlink reference signal based on the one or more quantization scheme parameters and receives a report, from the wireless device, of quantized sampling information based on measurement of the downlink reference signal. The apparatus transmits one or more equalized data transmissions to the wireless device after receiving the quantized sampling information.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
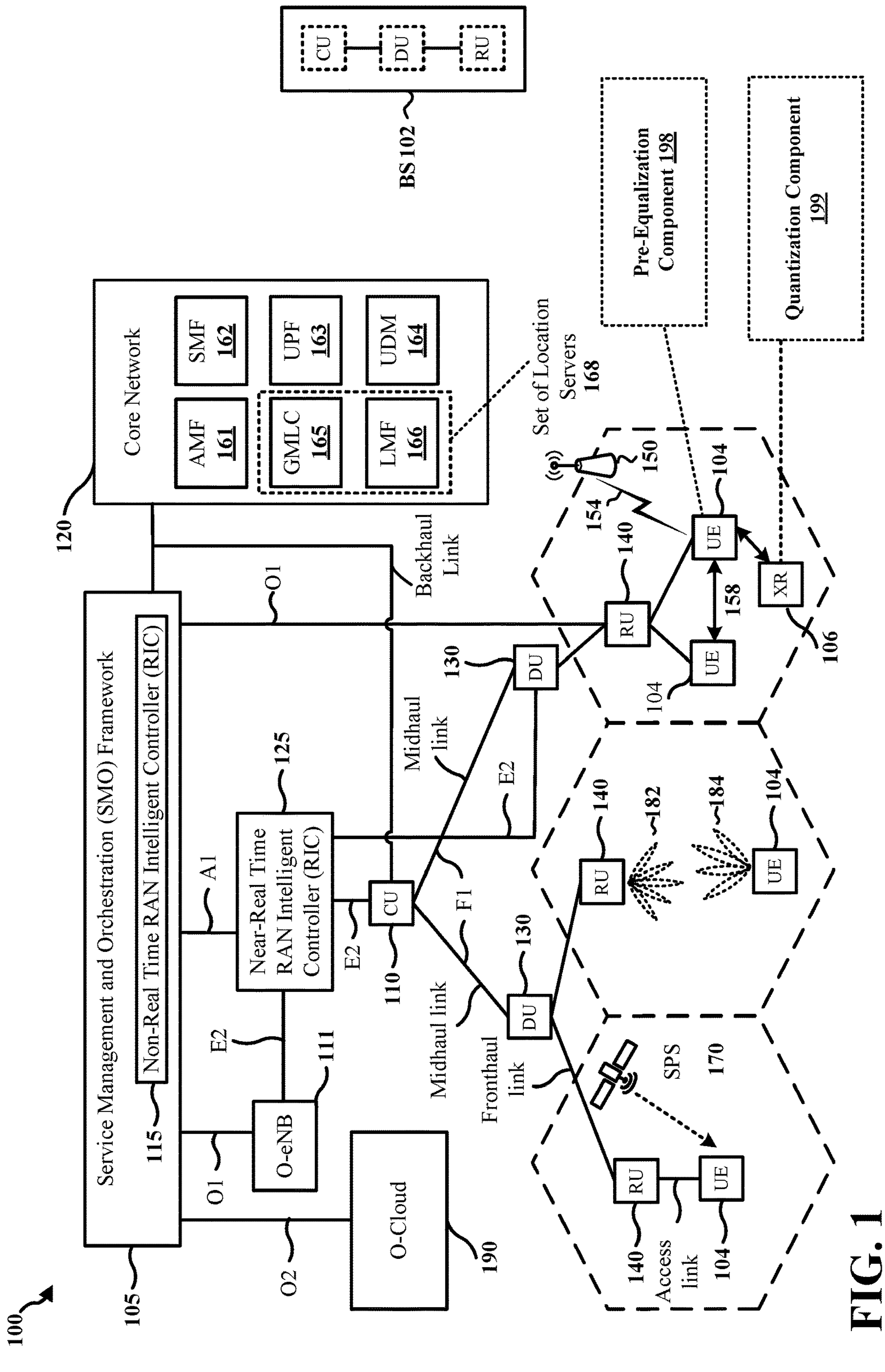
FIG. 1 is a diagram illustrating an example of a wireless communications system and an access network, in accordance with various aspects of the present disclosure.

In order to allow for less complex hardware, reduced battery size, and/or lower weight devices, a wireless device may exchange some wireless traffic with a wireless network via a companion device. As an example, an XR device may provide sensor data to an XR service via a UE. The XR service may return updated video data for the XR device based on the sensor data that was provided. The UE may process the video data before sending the video to the XR device to simplify the processing to be performed at the XR device. As an example, the UE may equalize the video data before transmitting the data to the XR device. In order to perform the equalization, the UE may receive information about the channel between the UE and the XR device. For example, the UE may transmit a reference signal, and the XR device may provide the UE with measurement information that that the UE can use to apply the equalization to the data (e.g., video) before sending the data to the UE. As presented herein, the XR device may use quantization to sample and report the reference signal from the UE, which can allow for reduced complexity and save power at the UE. The UE may indicate one or more quantization scheme parameters to the XR device, and the XR device may measure and/or report the reference signal measurements based on the indicated quantization scheme parameters.

The aspects presented herein facilitate reducing modem power consumption at the XR device (e.g., the receiver-side of the modem/link), for example, by "shifting" of the channel estimation and equalization related complexity and functionality from the XR device to its companion device/UE (e.g., the transmission-side of the link). Additionally, "shifting" the channel estimation and equalization related complexity and functionality to the companion device facilitates a simplified XR device modem hardware, a smaller XR device battery size, and a lower XR device weight. The disclosed adaptive hybrid sampling and quantization scheme supports aggressive complexity offloading from the XR device to the companion device, which brings the XR device closer to an "XR as I/O device" scenario and/or an "on the go" XR device.

In some aspects, the disclosed techniques facilitate downlink reference signal samples indication with low uplink signaling overhead, for example, based on the adaptive hybrid sampling and quantization scheme. Such a scheme may facilitate relatively frequent channel state information (CSI) refresh procedures, which, thus, corresponds to a robust transmission-side pre-equalization-based scheme.

Although the example for quantization of the sampled downlink reference signal and the equalization of data based on the quantized samples are presented using an example of XR traffic and an XR device as an example of a low-power, low complexity device, the concepts may be similarly applied for other power/battery limited device scenarios, link types, frequency bands or applications The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUS), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs (e.g., a CU 110) that can communicate directly with a core network 120 via a backhaul link, or indirectly with the core network 120 through one or more disaggregated base station units (such as a Near-Real Time (Near-RT) RAN Intelligent Controller (RIC) (e.g., a Near-RT RIC 125) via an E2 link, or a Non-Real Time (Non-RT) RIC (e.g., a Non-RT RIC 115) associated with a Service Management and Orchestration (SMO) Framework (e.g., an SMO Framework 105), or both). A CU 110 may communicate with one or more DUs (e.g., a DU 130) via respective midhaul links, such as an F1 interface. The DU 130 may communicate with one or more RUs (e.g., an RU 140) via respective fronthaul links. The RU 140 may communicate with respective UEs (e.g., a UE 104) via one or more radio frequency (RF) access links. In some implementations, the UE 104 may be simultaneously served by multiple RUs.

Each of the units, i.e., the CUS (e.g., a CU 110), the DUs (e.g., a DU 130), the RUs (e.g., an RU 140), as well as the Near-RT RICs (e.g., the Near-RT RIC 125), the Non-RT RICs (e.g., the Non-RT RIC 115), and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 140 can be implemented to handle over the air (OTA) communication with one or more UEs (e.g., the UE 104). In some implementations, real-time and non-real-time aspects of control and user plane communication with the RU 140 can be controlled by a corresponding DU. In some scenarios, this configuration can enable the DU(s) and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs, DUs, RUS and Near-RT RICs. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs (e.g., the RU 140) and the UEs (e.g., the UE 104) may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UE 104 may use spectrum up to Y [MHz] (e.g., 5, 10, 15, 20, 100, 400, etc. [MHz]) bandwidth per carrier allocated in a carrier aggregation of up to a total of Yx[MHz] (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication (e.g., a D2D communication link 158). The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with a UE 104 (also referred to as Wi-Fi stations (STAs)) via communication link 154, e.g., in a 5 [GHz] unlicensed frequency spectrum or the like. When communicating in an unlicensed frequency spectrum, the UE 104/Wi-Fi AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 [MHz]-7.125 [GHz]) and FR2 (24.25 [GHz]-52.6 [GHz]). Although a portion of FR1 is greater than 6 [GHz], FR1 is often referred to (interchangeably) as a "sub-6 [GHz]" band in various documents and articles. A similar nomenclature issue sometimes occurs with regard to FR2, which is often referred to (interchangeably) as a "millimeter wave" band in documents and articles, despite being different from the extremely high frequency (EHF) band (30 [GHz]-300 [GHz]) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 [GHz]-24.25 [GHz]). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 [GHz]. For example, three higher operating bands have been identified as frequency range designations FR2-2 (52.6 [GHz]-71 [GHz]), FR4 (71 [GHz]-114.25 [GHz]), and FR5 (114.25 [GHz]-300 [GHz]). Each of these higher frequency bands falls within the EHF band.

With the above aspects in mind, unless specifically stated otherwise, the term "sub-6 [GHz]" or the like if used herein may broadly represent frequencies that may be less than 6 [GHz], may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band. The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) (e.g., an AMF 161), a Session Management Function (SMF) (e.g., an SMF 162), a User Plane Function (UPF) (e.g., a UPF 163), a Unified Data Management (UDM) (e.g., a UDM 164), one or more location servers 168, and other functional entities. The AMF 161 is the control node that processes the signaling between the UE 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) (e.g., a GMLC 165) and a Location Management Function (LMF) (e.g., an LMF 166). However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AOD), DL time difference of arrival (DL-TDOA), UL time difference of arrival (UL-TDOA), and UL angle-of-arrival (UL-AoA) positioning), and/or other systems/signals/sensors.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may provide wireless traffic to and from a network for a wireless device. The wireless device may support XR communication, and may be referred to as an XR device 106, in some examples. The UE 104 may be in communication with the XR device 106 via a short range communication link, such as D2D communication link (e.g., a D2D communication link 158). In some aspects, XR processing workloads may be "shifted" (e.g., offloaded) from the XR device 106 to the UE 104, and the UE 104 may be referred to as a companion device, in some examples. In some aspects, offloading the XR processing workloads to the UE 104 may facilitate reducing processing complexity at the XR device 106, for example, as hardware and/or components associated with the offloaded XR processing workloads may be removed (or made less complex) from the XR device 106. Additionally, offloading the XR processing workloads may also facilitate reducing the weight of the XR device 106.

In certain aspects, the UE 104 may have a pre-equalization component 198 that may be configured to transmit control signaling to a wireless device (e.g., the XR device 106), the control signaling indicating one or more quantization scheme parameters; transmit a downlink reference signal based on the one or more quantization scheme parameters; receive a report, from the wireless device, of quantized sampling information based on measurement of the downlink reference signal; and transmit one or more equalized data transmissions to the wireless device after receiving the quantized sampling information.

In another configuration, the wireless device (e.g., the XR device 106) may include a quantization component 199 that is configured to receive control signaling from the UE indicating one or more quantization scheme parameters; measure a downlink reference signal from the UE based on the one or more quantization scheme parameters; report, to the UE, quantized sampling information based on measurement of the downlink reference signal from the UE; and receive one or more equalized data transmissions from the UE after providing the quantized sampling information to the UE.

Figures 2A, 2B, 2C, 2D:
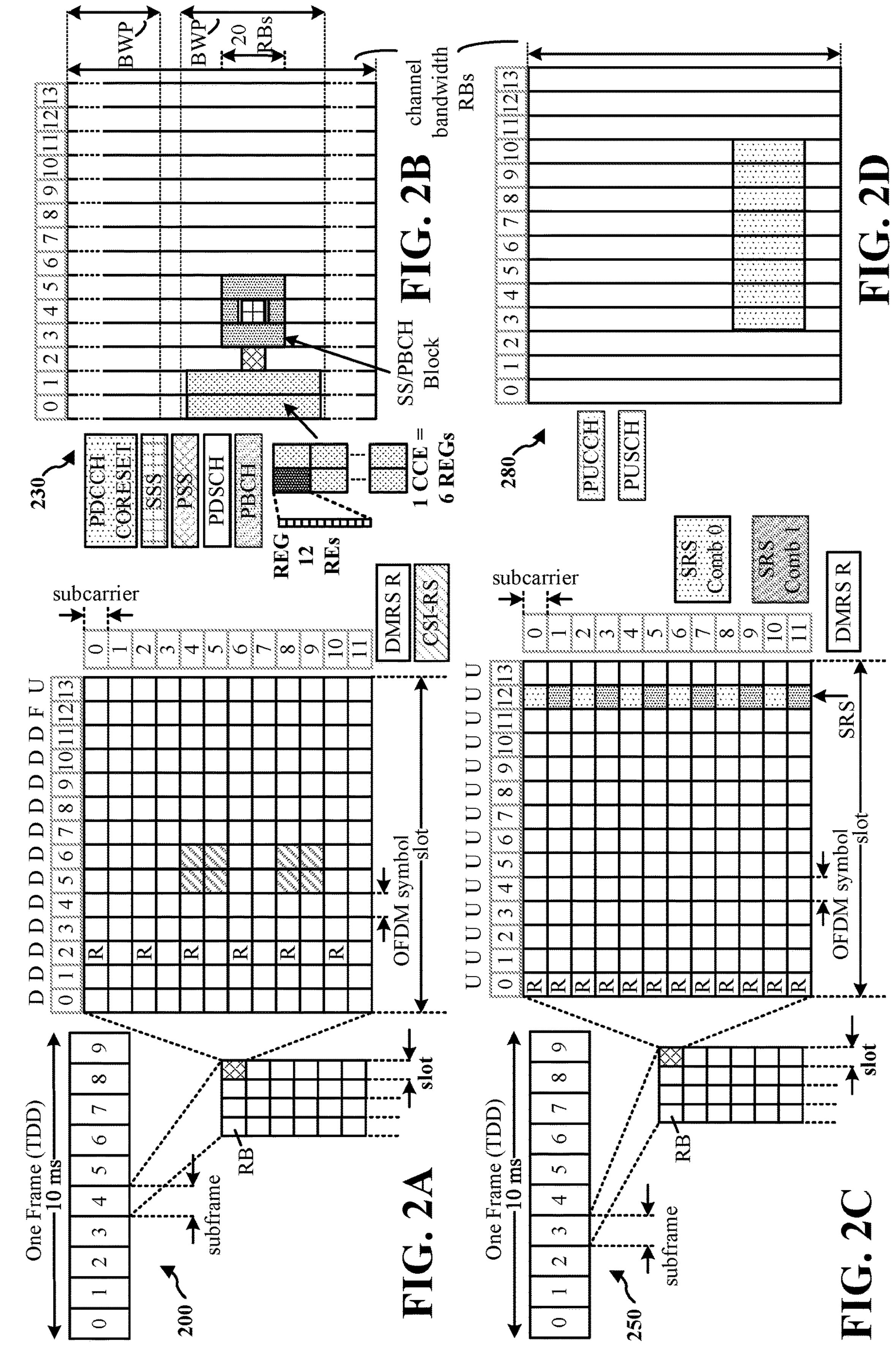
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

TABLE 1-continued

| Numerology, SCS, and CP | | |
|---|---|---|
| μ | SCS $\Delta f = 2^{\mu} \cdot 15$[kHz] | Cyclic prefix |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. As shown in Table 1, the subcarrier spacing may be equal to $2^{\mu}*15$ [kHz], where u is the numerology 0 to 4. As such, the numerology μ=0 has a subcarrier spacing of 15 [kHz] and the numerology μ=4 has a subcarrier spacing of 240 [kHz]. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 [kHz], and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
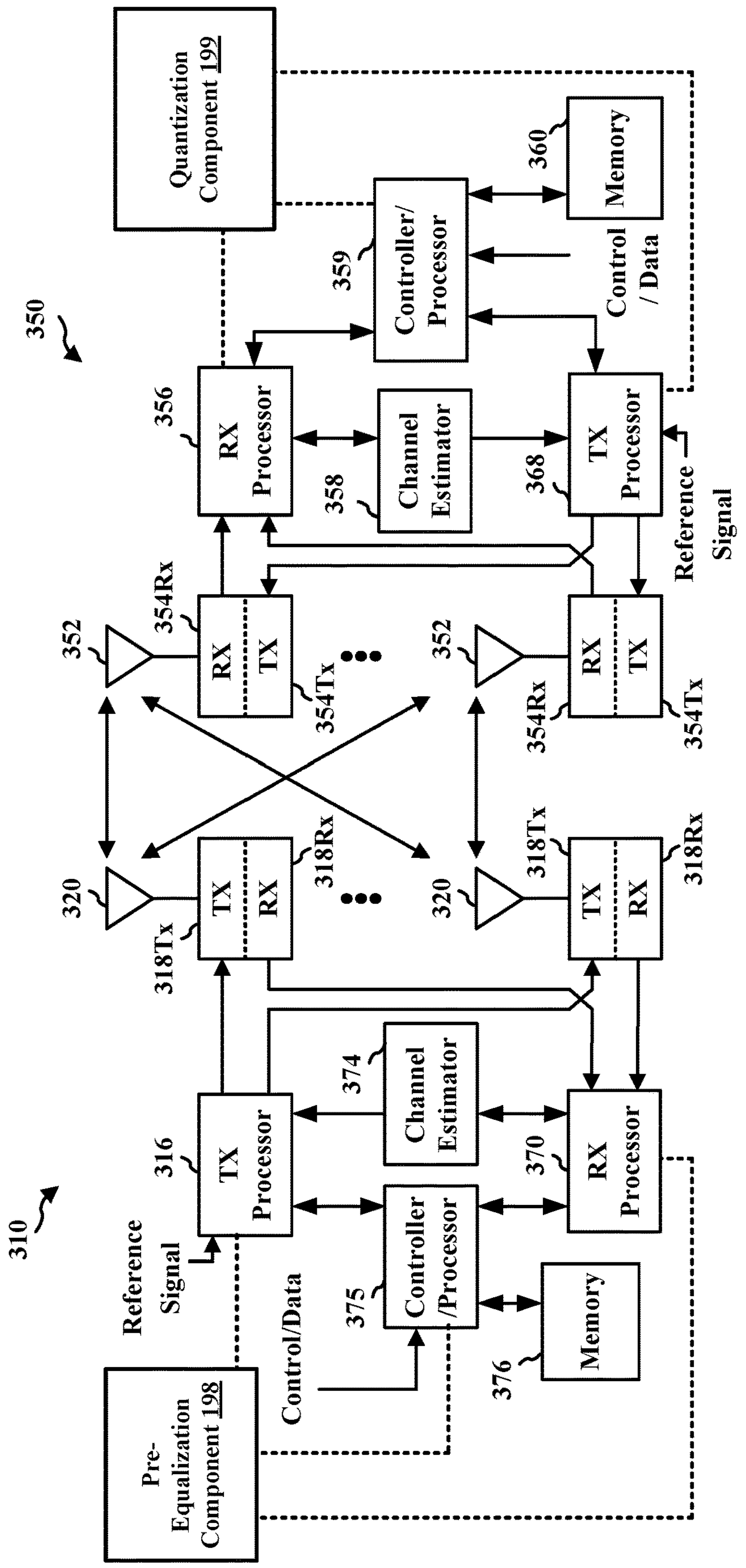
FIG. 3 is a diagram illustrating an example of wireless communication between wireless devices in an access network, in accordance with various aspects of the present disclosure.

FIG. 3 is a block diagram that illustrates an example of a first wireless device that is configured to exchange wireless communication with a second wireless device. In the illustrated example of FIG. 3, the first wireless device may include a UE 310, and the second wireless device may include an XR device 350, and the UE 310 may be in communication with the XR device 350 in an access network. As shown in FIG. 3, the UE 310 includes a transmit processor (TX processor 316), a transmitter 318Tx, a receiver 318Rx, antennas 320, a receive processor (RX processor 370), a channel estimator 374, a controller/processor 375, and at least one memory 376. The example XR device 350 includes antennas 352, a transmitter 354Tx, a receiver 354Rx, an RX processor 356, a channel estimator 358, a controller/processor 359, at least one memory 360, and a TX processor 368. In other examples, the UE 310 and/or the XR device 350 may include additional or alternative components.

In the DL (e.g., from the UE 310 to the XR device 350 in the example of FIG. 3), Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the XR device 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the XR device 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the XR device 350. If multiple spatial streams are destined for the XR device 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the UE 310. These soft decisions may be based on channel estimates computed by the channel estimator 358. The soft decisions are then decoded and deinterleaved to recover the data and control signals that were originally transmitted by the UE 310 on the physical channel. The data and control signals are then provided to the controller/processor 359, which implements layer 3 and layer 2 functionality.

The controller/processor 359 can be associated with the at least one memory 360 that stores program codes and data. The at least one memory 360 may be referred to as a computer-readable medium. In the UL (e.g., from the XR device 350 to the UE 310 in the example of FIG. 3), the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the UE 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the UE 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the UE 310 in a manner similar to that described in connection with the receiver function at the XR device 350. Each receiver 318Rx receives a signal through its respective antenna of the antennas 320. Each receiver 318Rx recovers information modulated onto an RF carrier and provides the information to the RX processor 370.

The controller/processor 375 can be associated with the at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the pre-equalization component 198 of FIG. 1.

At least one of the TX processor 368, the RX processor 356, and the controller/processor 359 may be configured to perform aspects in connection with the quantization component 199 of FIG. 1.

Wireless communication may include various types of traffic. As one example of traffic that may be supported by a wireless communication system is extended reality (XR) traffic. XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and/or other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a real environment and/or mask real objects from the real environment. XR traffic may include video data and/or audio data. XR traffic may be transmitted or received by a network entity, a UE, and/or a XR device. As one example, an XR device may include glasses that a user wears and that are in communication with a UE to receive and/or transmit XR traffic.

Figure 4:
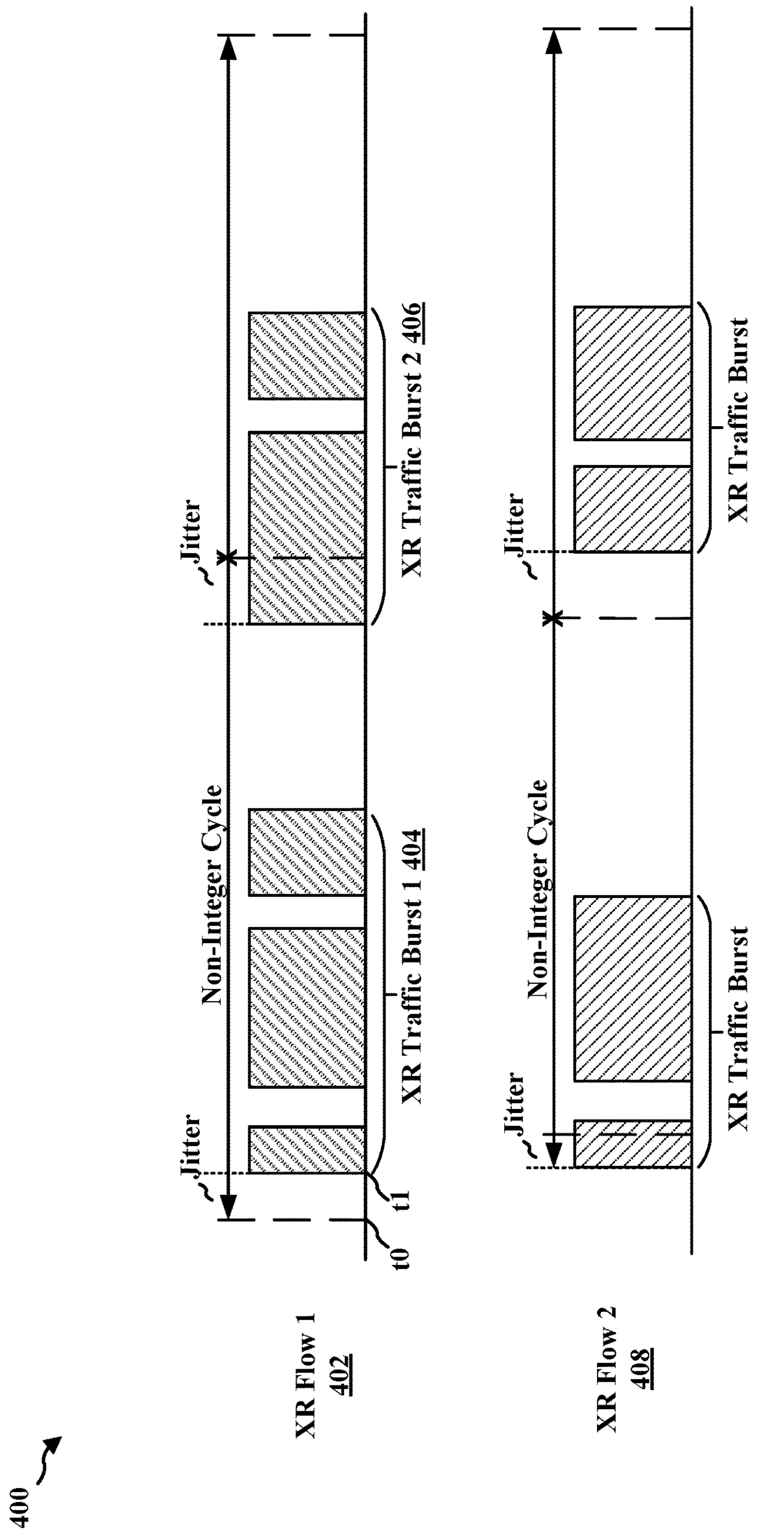
FIG. 4 is a diagram illustrating example XR traffic, in accordance with various aspects of the present disclosure.

XR traffic may arrive in periodic traffic bursts ("XR traffic bursts"). An XR traffic burst may vary in a number of packets per burst and/or a size of each packet in the burst. FIG. 4 is a diagram 400 illustrating example XR traffic, as presented herein. The diagram 400 illustrates a first XR flow 402 that includes a first XR traffic burst 404 and a second XR traffic burst 406. As illustrated in the diagram 400, the respective traffic bursts may include different numbers of packets. For example, the first XR traffic burst 404 is shown with three packets (represented as rectangles in the diagram 400) and the second XR traffic burst 406 is shown with two packets. Furthermore, as illustrated in the diagram 400, the three packets in the first XR traffic burst 404 and the two packets in the second XR traffic burst 406 may include varying amounts of data.

XR traffic bursts may arrive at non-integer periods (e.g., in a non-integer cycle). The periods may be different than an integer number of symbols, slots, etc. In an example, for 60 frames per second (FPS) video data, XR traffic bursts may arrive in $\frac{1}{60}$=16.67 ms periods. In another example, for 120 FPS video data, XR traffic bursts may arrive in $\frac{1}{120}$=8.33 ms periods.

Arrival times of XR traffic may vary. For example, XR traffic bursts may arrive (e.g., from an application) and be available for transmission at a time that is earlier or later than a time at which a UE (or a network entity) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time to, but the first packet of the first XR traffic burst 404 arrives at time t1.

XR traffic may include multiple flows that arrive at a UE (or a network entity) concurrently with one another (or within a threshold period of time). For instance, the diagram 400 includes a second XR flow 408. The second XR flow 408 may have different characteristics than the first XR flow 402. For example, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

In general, XR traffic may be characterized by relatively high data rates and low latency. The latency in XR traffic may affect the user experience. For instance, XR traffic may have applications in eMBB and URLLC services.

Figure 5:
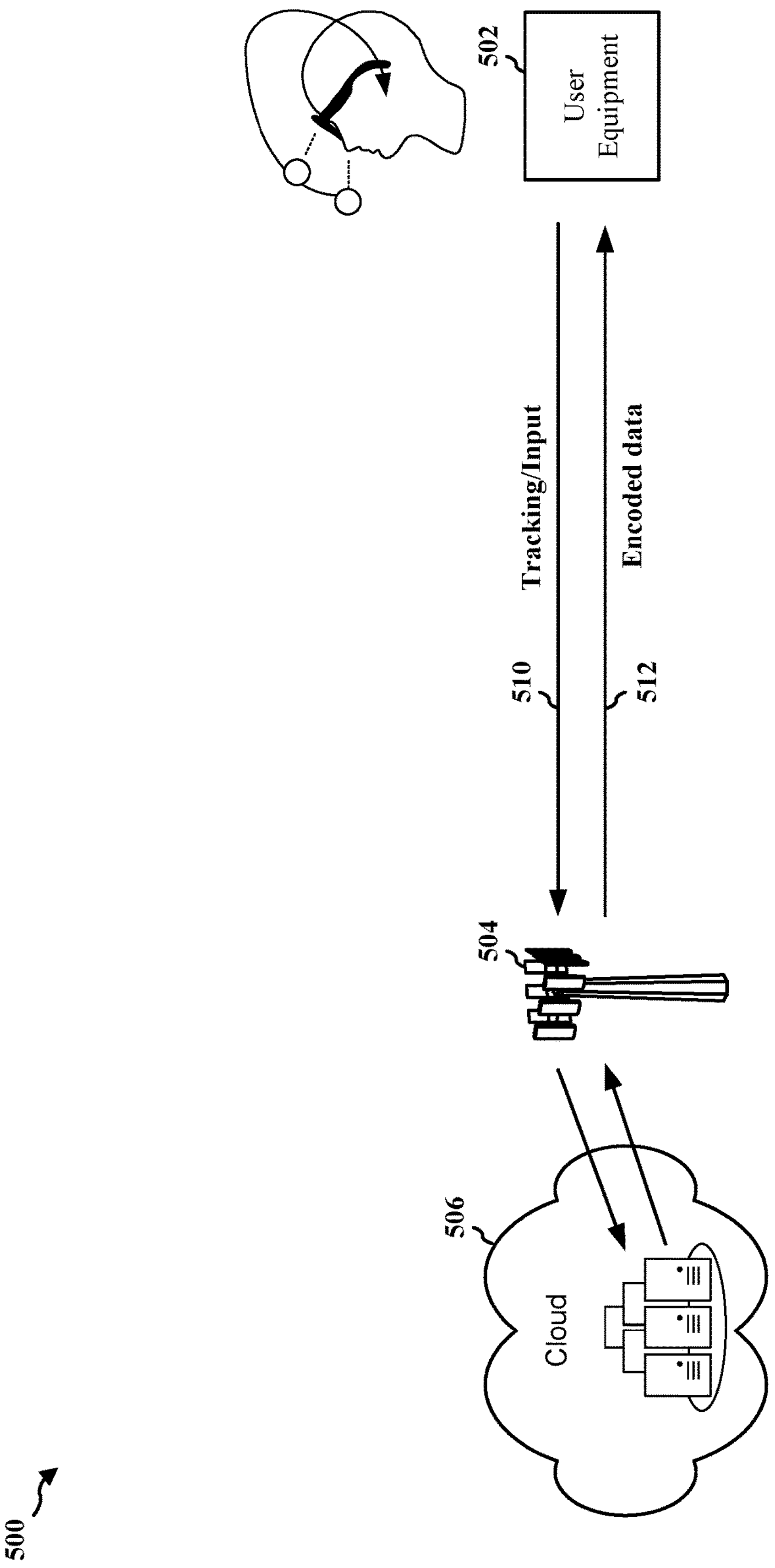
FIG. 5 is a diagram illustrating an example of wireless communication that can include low latency traffic, in accordance with various aspects of the present disclosure.

FIG. 5 is a diagram 500 illustrating an example of wireless communication that can include low latency traffic, as presented. The diagram 500 may include a UE 502 ("User Equipment), a base station 504, and a cloud server 506. In some aspects, the service provided to the UE 502 may be associated with low latency traffic. In one example, the UE 502 and the base station 504 may be configured to provide an XR service or a cloud gaming service, and the associated traffic may be associated with a low latency. Accordingly, an uplink packet 510 may include input information such as tracking information or user pose information for the XR service or inputs for the cloud gaming service. In some examples, the uplink packet 510 may include data of 100 bytes every 2 ms (at 500 [Hz]). The cloud server 506 may receive the uplink packet 510 and generate a downlink packet 512 based on the uplink packet 510. For example, the cloud server 506 may receive the uplink packet 510 including the tracking/pose information for the XR service or inputs for the cloud gaming service, and generate the downlink packet 512 based on the uplink packet 510 including the tracking/pose information for the XR service or inputs for the cloud gaming service.

The downlink packet 512 may include encoded data associated with the service provided to the UE. For example, the encoded data may include data of over 100 kilobytes at 45, 60, 75, or 90 frames per second (fps), i.e., every 22, 16, 13, or 11 milliseconds, respectively. The XR service or the cloud gaming service may be provided from a cloud server (e.g., the cloud server 506), and the downlink packet 512 may include a quasi-periodic encoded video with burst frame every 1/fps seconds or two, possibly staggered, "eye-buffers" (or images) per frame every ½*fps seconds. In case the UE 502 is provided with the cloud gaming service, the downlink packet 512 may include quasi-periodic encoded video with a burst frame every fps-seconds. In case the UE 502 is provided with the XR service, the downlink packet 512 may include quasi-periodic encoded video with separate images, staggered or simultaneously, for each eye per frame every ½*fps seconds.

In some aspects, the latency observed from the UE 502 may be associated with a round-trip time (RTT) between transmitting the uplink packet 510 and receiving the downlink packet 512. That is, the network latency experienced at the UE 502 may be determined based on the RTT between transmitting the uplink packet 510 including the tracking/pose information for the XR service or the inputs for the cloud gaming service and receiving the downlink packet 512 including the encoded data associated with the service provided to the UE 502. In one example, the network latency at the UE 502 may be configured as the time between transmitting the uplink packet 510 including the input information associated with the service provided to the UE 502 and receiving the encoded data associated with the service provided to the UE, the encoded data including a quasi-periodic encoded video with burst frame every 1/fps seconds or two, possibly staggered, "eye-buffers" (or images) per frame every ½*fps seconds. For example, the wireless network may be configured to have the RTT less than or equal to 20 ms to support the input information associated with the service provided to the UE 502.

Figure 6:
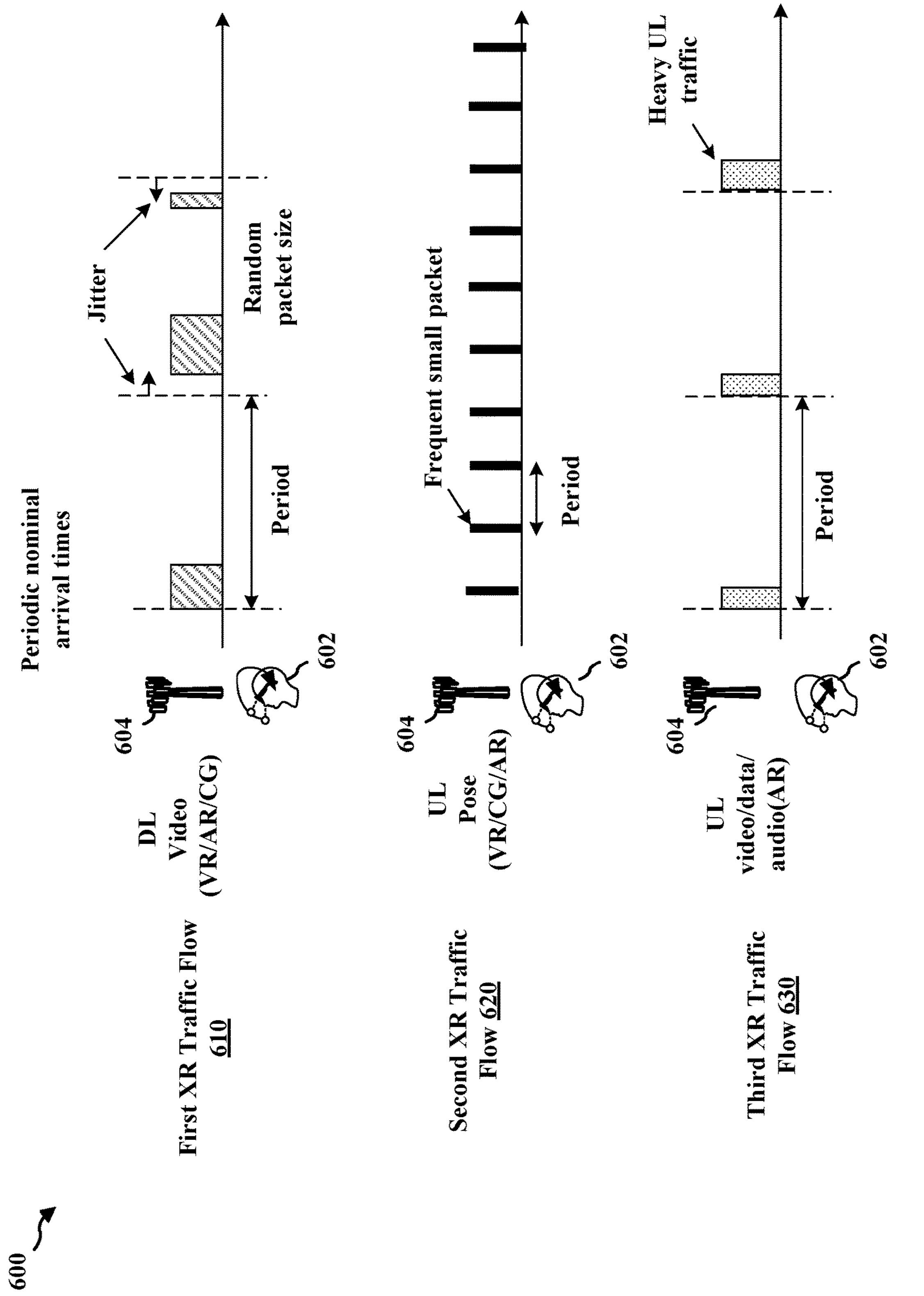
FIG. 6 is a diagram illustrating example XR traffic characteristics and an example of processing at an XR server and an XR device, in accordance with various aspects of the present disclosure.

FIG. 6 is a diagram 600 illustrating example XR traffic characteristics and an example of processing at an XR server and an XR device. As shown in FIG. 6, the diagram 600 includes a first XR traffic flow 610 that corresponds to downlink video from a base station 602 to a UE 604, such as the downlink packet 512 of FIG. 5. The packets of the first XR traffic flow 610 may be associated with periodic nominal arrival times, may be associated with jitter, may have random packet sizes, and/or may be associated with a packet delay bound (PDB). The diagram 600 also includes a second XR traffic flow 620 and a third XR traffic flow 630, which correspond to uplink traffic from the UE 604 to the base station 602. In the illustrated example of FIG. 6, the second XR traffic flow 620 corresponds to pose information and may be associated with a frequency small packets. The third XR traffic flow 630 of FIG. 6 corresponds to video data or audio data and may be associated with a heavy uplink traffic (e.g., larger sized packets).

XR devices may be developed to be light weight to be appropriate for a long-time use "on the go." For example, XR glasses may be developed to have a weight comparable to regular (e.g., non-XR) glasses, such as 30 grams to 40 grams. In some aspects, achieving such a light weight may rely on development of light-weight batteries.

Development of XR devices may also consider limited processing complexity and power consumption to comply with the available heat dissipation ability on the XR device. For example, the available heat dissipation ability of an XR device may be smaller than, for example, a UE since the available heat dissipation ability is proportional to the surface size of the XR device, which may be smaller than for a UE. As an example, for smart wearable XR goggles, the power consumption limit from the point of view of heat dissipation may be limited to only a few Watts. Thus, the development of XR devices may consider power consumption to allow for a light weight power source (e.g., a battery) and a reasonable battery lifetime.

Moreover, supporting a light-weight device with reasonable power consumption may be difficult when considering that support of many XR applications may use a heavy processing workload. A stand-alone XR device may not comply with being "on the go" and, thus, may be relevant for some specific or static applications and/or may be used in short-term usage scenarios. Such a stand-alone XR device may be associated with a higher form factor head-mounted device (HMD) usage.

However, as applications and/or scenarios using a higher form factor HMD may be inconvenient for a user in some situations, part of XR-related processing may be shifted to a companion device using a split XR approach to reduce complexity at the XR device.

Figure 7:
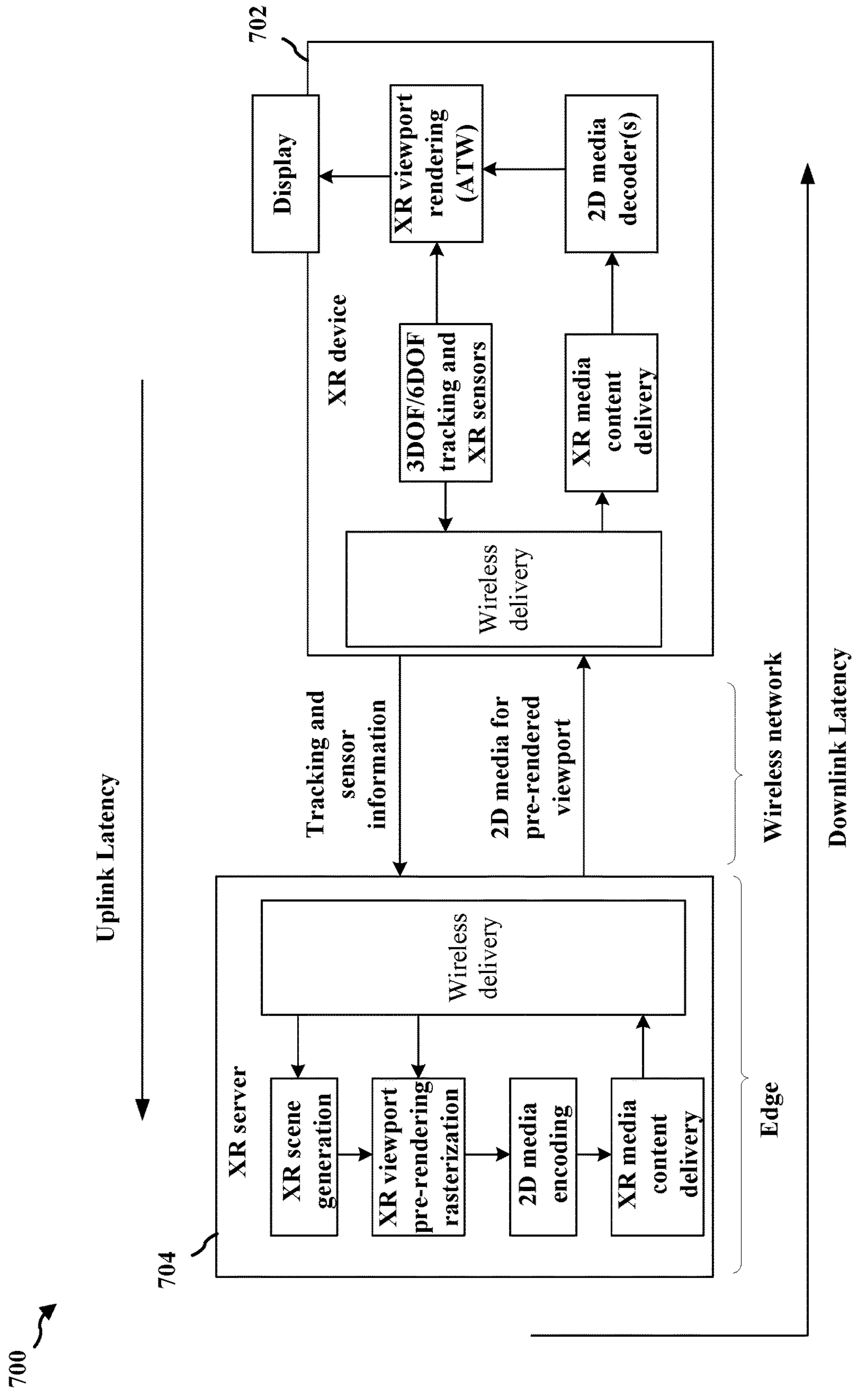
FIG. 7 is a diagram illustrating a split XR architecture, in accordance with various aspects of the present disclosure.

FIG. 7 is a diagram 700 illustrating a split XR architecture, as presented herein. In the illustrated example of FIG. 7, the diagram 700 includes an XR device 702 and an XR server 704. Aspects of the XR device 702 may be implemented by the UE 502 and aspects of the XR server 704 may be implemented by the cloud server 506 of FIG. 5. In the illustrated example of FIG. 7, user pose information and input information is transmitted by the XR device 702 and received by the XR server 704. The XR server 704 may then transmit rendered video frame(s) that are received by the XR device 702 for display by the XR device 702. User pose information and controller transmission rates may be the same as the video frame rate, such as 90 [Hz]. The XR server 704 may render a video frame based on the latest (or most recent) user pose information available to the XR server 704. To provide a good user experience, the delay from user motion (e.g., at the XR device 702) to server render (e.g., at the XR server 704) to the device display (e.g., at the XR device 702) may be minimized. The delay may also be referred to a user Motion To server Render To device display (Photon) (M2R2P) delay. In some aspects, the M2R2P delay may vary based on the RTT (e.g., as described in connection with FIG. 5) and the multimedia processing times at the client (e.g., the XR device 702) and the server (e.g., the XR server 704). Additionally, the RTT may be based on the uplink latency and the downlink latency. Equation 1 (below) describes the M2R2P delay in connection with 5G communications. Equation 2 (below) describes the RTT in connection with 5G communications. However, other examples may be based on additional or alternate wireless technologies.

$$M2R2P = 5G\text{−}RTT + \text{Client Multimedia Processing Time} + \text{Server Multimedia Processing time.} \quad \text{Equation 1}$$

$$5G\text{−}RTT = 5G\ \text{Uplink Latency} + 5G\ \text{Downlink Latency} \quad \text{Equation 2}$$

In some examples of a split XR architecture, as described in connection with the examples of FIG. 5 and FIG. 7, rendering related processing may be moved to a companion device, but the processing components may still be included in the XR device. For example, the processing components may be included in the XR device for end-to-end considerations, such as photon-to-motion latency requirements, XR to companion device wireless link capacity, communication link power consumption for long range links, etc. However, although the example split XR architecture of FIG. 5 and FIG. 7 reduce power consumption on the XR device, the power consumption associated with less demanding applications may still be high for achieving a less demanding video quality and/or a user experience benchmark. Thus, such a split XR scenario may still not provide a light-weight XR device with reasonable power consumption that complies with heat dissipation related constraints for more demanding XR applications (e.g., premium XR applications) associated with video formats of at least 8K and frames per second of at least 120 [GHz].

In the example split XR architecture of FIG. 5 and FIG. 7, long range communication links over a licensed spectrum with a tight scheduling and staggering among different served XR users may be assumed. In some such scenarios, the capacity per user may be a limitation and, correspondingly, an XR device may employ one or more sensors for local processing to reduce uplink data volume, such as 6DOF (6 degrees-of-freedom) tracking, eye tracking for field of vision (FOV) derivation, etc. Additionally, additional critical sensors (e.g., cameras, etc.) data from the XR device (e.g., uplink traffic) and the rendered video for the XR device (e.g., downlink traffic) may be compressed with a very high compression factor, for example, due to a limited link capacity per user. Pre-processing sensor data at the XR device and video compression with sufficiently high compression factors (e.g., a high profile of H264 video coding) may be associated with high complexity, especially at the encoder side, and may be associated with extensive double data rate (DDR) usage for both transmission/reception path video processing. In some examples, receiver-side processing at the XR device may include asynchronous time wrapping (ATW) for last moment image alignment with the latest pose information, for example, to satisfy photon-to-motion latency requirements and/or base station-based split-related latencies. Additionally, power consumption for such split XR architectures may still be relatively high above a target for an XR device with a light-weight and small form factor wearable XR device.

In scenarios in which a split XR architecture is employed, the XR device may have a device power budget that includes an HMD component (e.g., the power used by the XR device itself), a processor component (e.g., the power used by a system on a chip (SOC)), and a modem component. However, other examples may include additional or alternate components of a device power budget. Additionally, in scenarios in which there may be a fixed device processing power envelope, employing a split XR architecture may facilitate access to processing capabilities at order-of-magnitude higher levels. For example, XR wearable glasses may be limited to 1.5-3 Watts due to heat dissipation related constraints. An XR split architecture may facilitate offloading processing workloads from the XR device to edge processing, which may increase the total amount of XR-related processing performed (e.g., by the XR device and via edge processing) while also satisfying heat dissipation related constraints at the XR device.

The HMD component of the power budget may be associated with providing power to one or more components of the XR device, such as display(s), camera(s), sensor(s), etc. The processor component of the power budget may be associated with processing of information, such as performing data compression/decompression procedures, performing pre-processing procedures, performing post-processing procedures, etc. The modem component of the power budget may be associated with receiving and transmitting information over a communication interface. The modem component may increase with worsening channel conditions, with increasing numbers of users, etc. The modem component may decrease by applying one or more power saving schemes. In some aspects, power saving schemes for low-latency traffic may facilitate harnessing device access to edge processing, such as at a base station.

Figure 8:
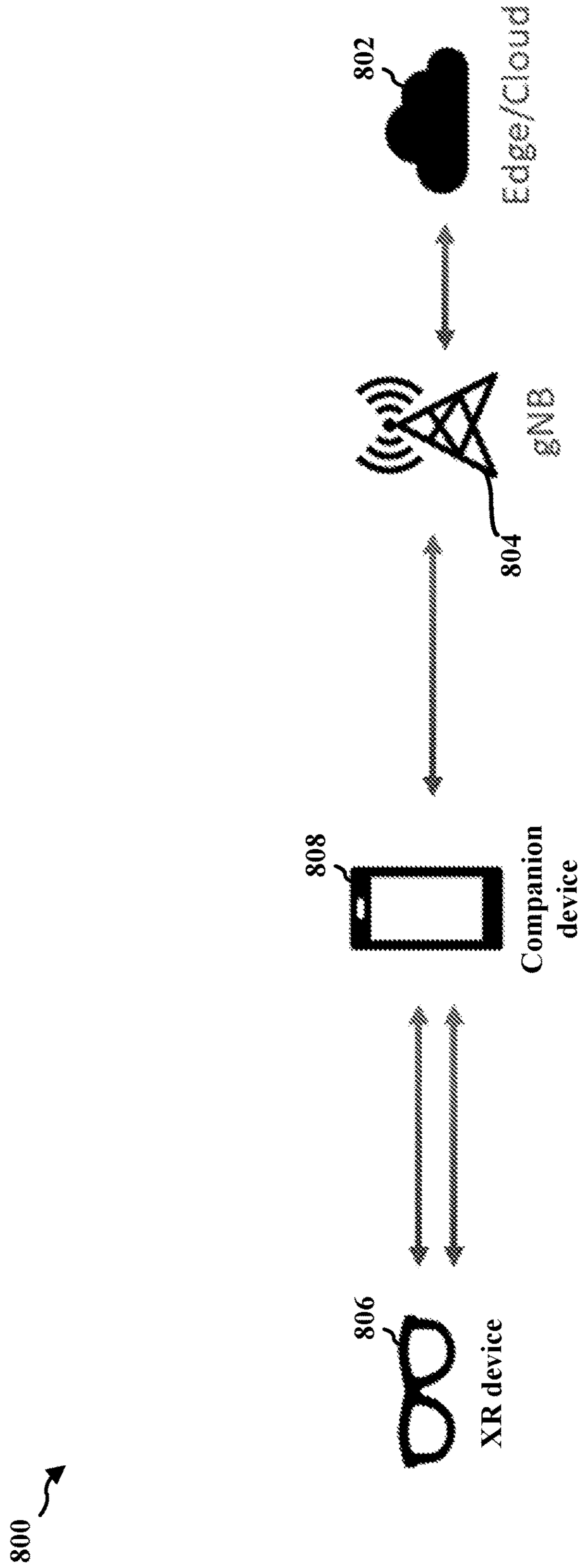
FIG. 8 is a diagram illustrating another split XR architecture, in accordance with various aspects of the present disclosure.

FIG. 8 is a diagram 800 illustrating another split XR architecture, as presented herein. Similar to the example of FIG. 5, the split XR architecture of FIG. 8 includes a cloud server 802 in communication with a base station 804 ("gNB"). The cloud server 802 and the base station 804 may be in communication via a network, such as the Internet. In contrast to the example of FIG. 5, the split XR architecture of diagram 800 includes an XR device 806 in communication with a companion device 808. The companion device 808 may include a UE. In some examples, the companion device 808 may be referred to as a "puck." The base station 804 and the companion device 808 may be in communication via a long-range wireless technology, such as 5G NR. The XR device 806 and the companion device 808 may be in communication via D2D communication, such as sidelink.

In the diagram 800, the example split XR architecture facilitates processing offloading with tethering to a relatively nearby companion device (e.g., the companion device 808) and/or a processing split between the XR device 806, the companion device 808, and the base station 804. From the perspective of the XR device 806, the split XR architecture of FIG. 8 may assume a similar processing load with local functionality on the XR device-side as the example split XR architecture of FIG. 5. However, the XR device 806 may include a local short range communication link with the companion device 808, which may allow for reducing modem-related power consumption, but not other types of power consumption.

In another aspect, a different approach for the split XR architecture of FIG. may include a more aggressive processing offloading from the XR device 806 to another device. Such a scenario may facilitate a low power and light-weight solution for "on the go" wearable XR devices. For example, such a split XR scenario may utilize aggressive processing offloading from the XR device 806 to a companion device (e.g., the companion device 808 or the companion device 808 and the base station 804). In this manner, the XR device 806 may be configured to operate as a mostly input/output (I/O) device that shares (e.g., provides) local sensor information with the companion device and by skipping performing pre-processing on the local sensor information. In addition, the rendered video that the XR device 806 receives for presentment may be displayed directly and without performing post-processing procedures. Such a split XR scenario may reduce power consumption, for example, compared to the split XR architecture of FIG. 5.

For example, a change from a higher profile uplink and downlink communication to a split in which the XR device does light compression for the uplink traffic, and the UE performs intra profile for the downlink without processing at the XR device side, can help to reduce power consumption and complexity at the XR device. As an example, a power reduction of approximately one half may be enabled at the XR device.

Figure 9A:
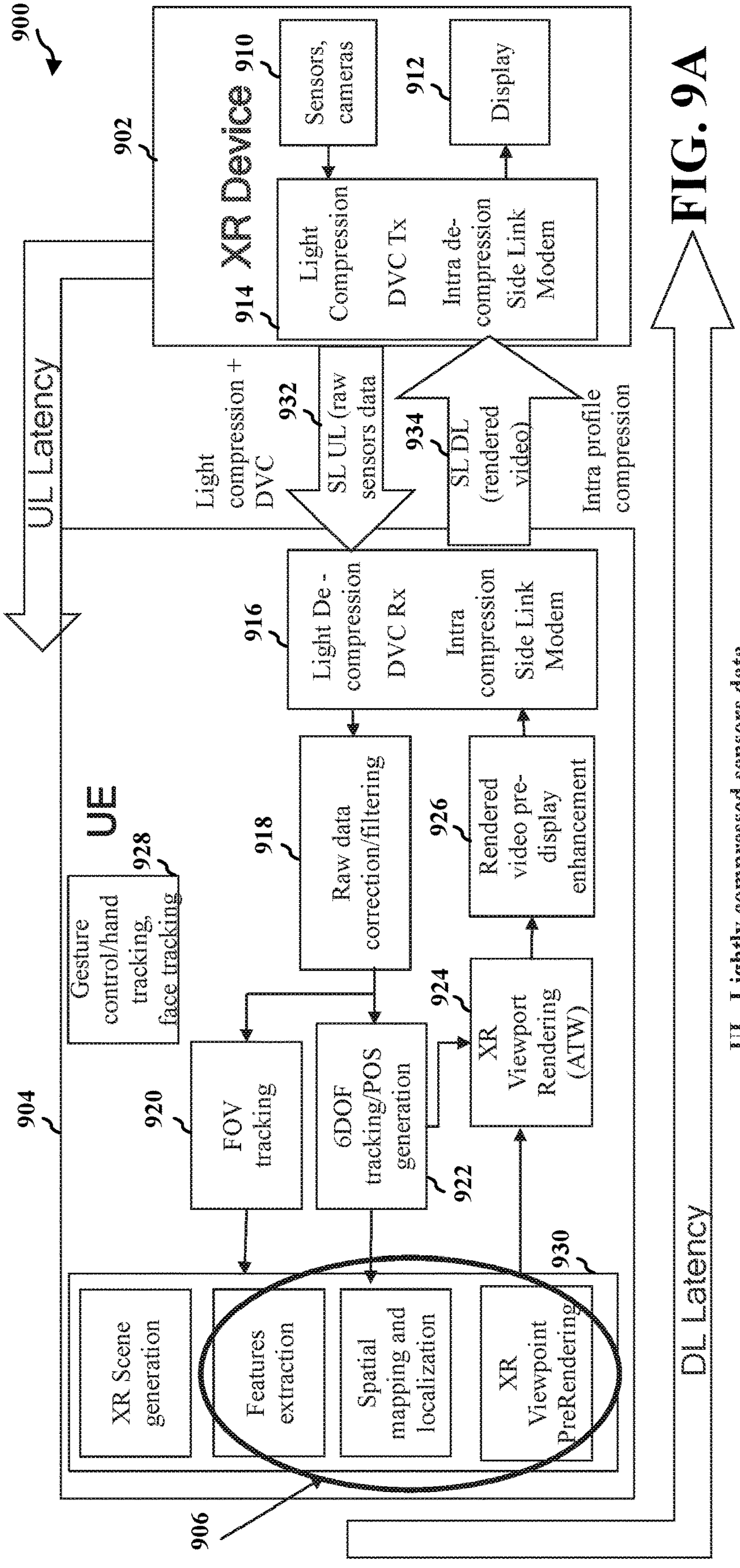
FIG. 9A is a diagram showing an example XR split architecture including a split of XR processing between an XR device and a companion device, in accordance with various aspects of the present disclosure.

FIG. 9A is a diagram showing an example XR split architecture 900, e.g., a split of XR processing between an XR device 902 and a companion device, such as a UE 904. The arrow at 906 illustrates example functionality that may be further offloaded to the network, such as to a base station, in an example of an option with a split across an XR device, a UE, and an edge server at a base station. FIG. 9A illustrates that the XR device 902 may include a sensor 910, such as a camera, and a display 912. The XR device may have one or more components 914 configured to perform light compression of the sensor data, distributed video coding (DVC) transmission, decompression of the rendered video from the UE, and sidelink modem processing to provide video to the display 912. The companion device (e.g., UE 904) may include one or more components 916 to perform light decompression of the sensor data 932 from the XR device 902, DVC reception, and intra-compression for sidelink communication. The UE may perform raw data correction and filtering, as shown at 918 to provide tracking and/or POS information, as shown at 920 and 922. In some aspects, the UE may include gesture control and/or hand or face tracking, as shown at 928. The UE may provide the tracking or POS information to a component 930 that performs XR scene generation, feature extraction, spatial mapping and localization and/or XR viewpoint prerendering based on the tracking and POS information. As shown at 924, the UE may perform XR viewport rendering and enhance the video for display, at 926 before providing the rendered video, e.g., over sidelink or downlink to the XR device 902, at 934.

Figure 9B:
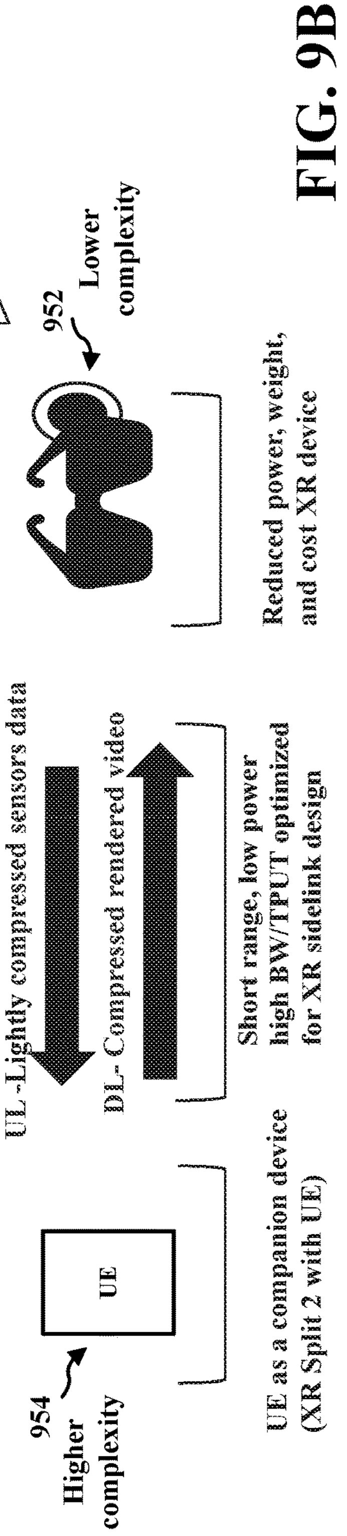
FIG. 9B illustrates an example of a lower complexity device that supports XR traffic and provides sensor data to a higher complexity companion device, in accordance with various aspects of the present disclosure.

FIG. 9B illustrates an example of a lower complexity device that supports XR traffic, e.g., that may be referred to as an XR device 952 that provides sensor data to a higher complexity companion device, which may be a UE 954. The UE 954 then provides compressed rendered video for display at the XR device 952. Through the use of the UE to perform some of the XR processing of the sensor data and/or received video, the XR device 952 can perform less complex processing to display the video based on the sensor data. The split may enable smaller, more lightweight components for the XR device while enabling a robust XR user experience.

In some aspects, the split XR approach may be for a wearable XR device, e.g., which may be referred to as an "on the go" wearable XR device. In some aspects, the XR device 902 may offload processing, e.g., full processing, to the UE 904. The split may allow for an XR device that is closer to an input/output (I/O) device. The XR device 902 may share or forward the XR device sensors/cameras data to the UE via an uplink or a sidelink. An uplink link may provide a higher throughput over a local short link, and/or lower power consumption at the XR device for sensor processing, video compression and modem operation. In some aspects, the XR device may not perform sensor or camera data processing before forwarding the sensor/camera data to the UE 904. In some aspects, the XR device 902 may not perform rendered video processing before displaying the video data from the UE 904. The UE may process, e.g., pre-process, the video, which may help to reduce latency for the link between the UE to the XR device. For example, there may be a negligible link latency for the UE to XR device link.

In some aspects, the XR device 902 may perform light compression and DVC for the uplink data (e.g., sensor/camera data) to minimize the video encoding related power consumption of the XR device. In some aspects, the XR device 902 may use a compression mode that is optimized for a minimum encoder power consumption, such as having a compromised compression factor (e.g., beyond options such as H264, H265). In some aspects, the complexity shift from the encoder side (e.g., at the XR device 902) to the decoder side (e.g., at the UE 904) may be the opposite of a structure in which the encoder carriers more complexity. The aspects enable the power consumption for the video compression to be shifted (e.g., lower compression factor) to power consumption for communication (e.g., a higher throughout) to achieve a lower overall power budget. The reduction in the power consumption may be based on a short-range, low power communication, e.g., which may be over an unlicensed frequency band. In some aspects, DVC may be employed for extra compression of the uplink data to the UE via channel coding, e.g., which may involve near zero power on the transmission side (at the XR device) and shifts the complexity to the receiver side (at the UE). DVC combining with a video encoder (with joint compression and channel coding) may involve video coding options not employing an entropy encoder.

In some aspects, the communication between the XR device 902 and the UE 904 maybe in an RF band RF for an XR local link or sidelink. As one example, the communication may be in ultrawide band frequency range (UWB), e.g., such as 7-10.6 [GHz] for ultrawide band communication with a short range, low power high bandwidth and throughput link. In some aspects, short range ultrawide band communication enables a lower complexity for full duplex communication, e.g., which may allow for a low latency link with doubled channel capacity through transmission and reception that overlap in time. In some aspects, the communication may be based on XR optimized lower power sidelink connection, such as for new radio unlicensed (NRU) on top of Wi-Fi bands. In some aspects, a base station may control channel access over an UWB with resources reused across different neighbor XR locations. For example, the base station may provide semi-persistent resource assignments via the UE 904. The resource assignments may be based on mutual interference or coupling reports for the UWB and/or multi-XR device synchronization within a co-scheduling group.

In some aspects the communication between the UE and the XR device may be based on a waveform that is optimized for lower power XR traffic over a local link band (e.g., such as UWB, Sidelink NRU, or WIFI band). The XR receiver side modem complexity may be shifted to the transmitter side of the link (e.g., from XR device 902 to the companion UE 904) for XR baseband modem power reduction at the XR device. As an example, the traffic from the UE may be based on transmission space-frequency pre-equalization for downlink, a UE driven synchronization loop for XR, UE driven/assisted channel estimation for XR reception, and/or a lighter complexity channel coding scheme. The XR traffic may include video aware mixed analog/digital communication for XR, graceful video QoS and user experience adaptation to channel capacity/allocated resources. In some aspects, cross-layer optimizations may be used for the XR communication, e.g., with a strong coupling between a PHY layer and video compression for the XR communication.

In some aspects, the XR device may not do double data rate (DDR) processing for the XR traffic. For example, the XR device may perform intra frame prediction for video compression, which may be referred to as a light, or lighter, compression scheme for uplink and Intra profile of H264 or similar usage for downlink. In some aspects, the XR device 902 may perform pipelined small data chunk processing from the receiver PHY output until display (e.g., for the XR receiver-side) and from the sensors/cameras output until transmission PHY (e.g., for the XR transmission-side). In some aspects, the XR device may store compressed data, e.g., and not uncompressed data. For example, the XR device may have an intermediate small volume buffer between PHY and upper layers. The XR may stagger time channel use and processing for different sensors, cameras, eyes, and/or displays.

The examples described in connection with FIGS. 9A and 9B illustrate an example design with modular components and extensions that may be applied for various types of wireless communication, including AR, XR, and/or VR traffic with a companion UE. In some aspects, the companion UE may be referred to as a "UE in the pocket."

As described in connection with the example split XR scenario of FIG. 9A and FIG. 9B, employing an aggressive XR functionality split so that more processing is performed at the companion device than the XR device may enable the XR device to operate as an I/O device (or nearly an I/O device). For example, receiver complexity at the XR device may be shifted from the XR device to the companion device. Additionally, moving additional or alternate functional components from the XR device to the companion device, such as the PHY layer-related complexity and/or modem-related complexity, may further facilitate achieving a low-weight, low complexity, and low power consumption XR device that may be wearable and facilitate "on the go" usage.

In general, modem complexity may be associated with receiver-side processing. Various techniques may be employed for reducing complexity associated with different PHY layer receiver components that may facilitate achieving a low complexity, low power consumption, and low latency XR device, for example, an XR sidelink device. In some aspects, applying transmission pre-equalization on the UE transmission-side may help to reduce the XR device receiver-side complexity and power consumption. For example, such transmission pre-equalization techniques, along with algorithmic enhancements and PHY layer procedures, may facilitate nearly the same throughput/performance without any significant degradations, for example, in user experience. Additionally, in some aspects, the throughput/performance may be similar to scenarios including performance gain for higher signal to noise ratio (SNR) compared to receiver-side equalization for the respective scenarios. When referring to transmission pre-equalization, a "quasi-continuous" CSI knowledge of the channel may be assumed. For example, such CSI knowledge may be achieved for scenarios with or without channel reciprocity if one or more transmission schemes/options are employed on XR sidelink (e.g., the communication link between the XR device and the companion device is sidelink). Example transmission schemes/options that may be used to achieve such CSI knowledge include a low latency TDD pattern, and full duplex or subband full duplex communication. It may be appreciated that in some aspects, full duplex operation may be easier to implement in scenarios utilizing a low power, short range link, such as XR sidelink. In some such examples, XR sidelink may be preferred to other communication technologies, such as an ultra-wideband (UWB) spectrum.

As described above, employing transmission pre-equalization allows shifting channel equalization complexity from the XR device receiver-side to the companion device transmission-side. Such a "shift" in channel equalization complexity may also facilitate achieving a low (or very low) XR device-side receiver PHY layer complexity target. In some aspects, downlink (DL) CSI information may be available at the transmission-side to facilitate the "shift" in channel equalization complexity. In some examples, with transmission pre-equalization, receiver-side channel estimation may be skipped for transmission-side pre-equalized data demodulation and decoding. Thus, it may be beneficial to exclude channel estimation complexity from the receiver-side (e.g., the XR device-side) for DL CSI acquisition procedures. Such scenarios may be achieved trivially for reciprocal scenarios, for example, the CSI may be obtained based on an UL channel. In scenarios without channel reciprocity, some aspects may sample a DL channel estimation reference signal (RS) on the receiver-side at the XR device. The XR device may then signal these samples to the companion device to facilitate evaluating DL channel estimation, performing pre-equalization, and performing $R_{nn}$ estimation at the companion device instead of the XR device.

In some aspects, new DL RS samples indication/reporting procedures may be used to support transmission pre-equalization. For example, the disclosed techniques may include DL RS waveforms and modifications to their respective allocation procedures definitions. In some aspects, the disclosed techniques may include modified UL resources allocation procedures for the DL RS samples reporting. Additionally, the disclosed techniques may provide for efficient DL RS sampling and a quantization/compression scheme to facilitate minimizing UL overhead (OH) and XR-side processing related to the DL RS samples indication and/or reporting procedures in uplink from the XR device to the companion device.

A quantization scheme (sometimes referred to as a compression scheme) facilitates reducing the size of information. For example, input information may be received at a quantizer and the quantizer may generate output information applying a quantization scheme to the input information. A representation of the input information may have a first size (e.g., a first number of bits), a representation of the output information have a second size (e.g., a second number of bits), and the representation of the output information may be smaller than the representation of the input information.

The quantizer may be configured with one or more quantization scheme parameters that determine the quantization (or compression) that is applied to the input information. For example, quantization scheme parameters may include one or more of a type of quantization scheme (e.g., whether to employ non-differential TD sampling or differential FD sampling), a sampling scheme (e.g., whether to perform time domain quantization or frequency domain quantization), a number of quantization levels/binary representation length per sample (e.g., a number of bits used to represent a sample), optimal quantization levels distribution, corresponding compandor/de-compandor function selection, and/or a frequency domain sampling rate. Additionally, the quantization scheme parameters may include a report size (e.g., a number of bits for the representation) and/or CSI refresh related parameters, such as a reference signal allocation period or a report resource allocation/reservation.

In some aspects, the communication between the UE and the XR device may be based on the channel between the two devices. As an example, an end-to-end (E2E) scheme for a downlink (or sidelink) from the UE 904 to the XR device 902, the UE may acquire CSI (e.g., at the transmission-side) without reciprocity. This allows for lower complexity at the XR device because the XR device can function with such CSI acquisition. The UE may transmit equalized transmissions, e.g., to allow for low complexity on the XR side PHY layer by means of shifting channel equalization, channel estimation and synchronization related complexity from the receiver (e.g., XR device) to the transmitter (e.g., UE).

Such CSI information may be conveyed to the UE (e.g., at the transmitter side) in an implicit manner, e.g., through downlink channel estimation of reference signal samples, and the channel estimate (CSI) may be evaluated on the transmitter side (e.g., at the UE instead of the XR device based on these samples. In some aspects, a combined/extended version of DM-RS and CSI-RS pilots, such as DM-RS or CSI-RS used in 5G-NR, among other examples, may be sampled at the XR device. The samples may then be quantized or compressed to be signaled back to the UE via an uplink for channel estimation to support a transmission pre-equalized transmission on a downlink (or sidelink) from the UE to the XR device.

In some aspects, to support a transmission pre-equalization scheme for highly frequency selective channels, such as for a UWB, a dense frequency domain allocation pattern may be used for the RS (e.g., such as DM-RS). The RS may be decoupled from a downlink data transmission and may not be pre-equalized or precoded as is done for the data (e.g., as CSI-RS).

In some aspects, one or more pilot waveforms and related procedures may include aspects using combined different RS (e.g., DM-RS and/or CSI-RS). In some aspects, the DM-RS may include a dense (or relatively dense) FD pattern that is coupled to data transmissions DM-RS. In some aspects, the CSI-RS may include a sparse (or relatively sparse) pattern that is decoupled from data transmissions.

In some aspects, a modified uplink resource allocation procedures may be used for the reporting of the RS samples (e.g., reporting from the XR device to the UE about the RS from the UE), and dedicated uplink resources may be associated with every RS allocation. The XR device may transmit the samples report similar to SCI part 2, for example, but with a lower MCS than uplink data.

In some aspects, the E2E scheme for efficient sampling and quantization/compression of the RS from the UE (e.g., which may be referred to as a DL RS) may help to reduce uplink signaling overhead/volume while preserving low complexity operation at the XR device.

There may be various sampling and quantization options, e.g., including differential encoding and Max-Lloyd quantization. The sampling and quantization can be applied either directly on raw (uncorrelated) time domain RS samples (while maintaining low (e.g., zero) complexity for the XR device) or on differentially encoded frequency domain RS samples exploiting frequency domain channel correlation (after FFT and pattern removal, with low complexity at the XR device).

Better quantization results can be achieved by using a nonuniform Max-Lloyd quantizer, which achieves the minimum squared quantization error with a given number of quantization levels constraint because it accounts for samples distribution for optimal quantization levels determination.

In some examples, performing sampled RS reporting from the XR device to the companion device (e.g., a UE) may be improved by preserving a low UL signaling volume or reducing the UL signaling volume. The UL signaling volume may include control signaling and data. In some aspects, low UL signaling volume, or overhead, (e.g., RS samples and/or raw CSI indications) may be achieved by applying an efficient quantization/samples compression scheme. For example, DL RS sampling may be addressed via time domain (TD) or frequency domain (FD). That is, the scheme may indicate how to quantize a DL RS using TD or FD. In some examples, FD samples may be correlative (e.g., across neighboring resource elements (REs), for example, after performing pattern removal (e.g., phase elimination) and/or port demultiplexing. In some such examples, it may be beneficial to use a differential quantizer that is coupled to an FD sampling option. In some examples, using a differential Max-Lloyd quantizer exploiting FD samples correlation may facilitate reducing UL signaling overhead, or may keep the UL signaling overhead reasonable to facilitate relatively frequent CSI refresh procedures for a transmission-side (e.g., at the companion device) equalized system. In some scenarios including direct TD sampling, there may be no (or limited) correlation across raw TD samples. In some such scenarios, a non-differential quantizer may be applied on the TD samples. That is, a differential encoder before quantization may provide no or limited benefit compared to a non-differential quantizer and, thus, using a non-differential quantizer may facilitate reducing complexity.

However, in some scenarios associated with low SNR, there may not be much correlation, even when FD samples are being used. For example, noise may be dominating and overwhelm both TD samples and FD samples. In some such scenarios, a direct TD sampling may be associated with a same minimum sufficient binary samples representation length, as in scenarios in which FD sampling is used, but with a lower involved complexity on the receiver-side/XR device-side. Additionally, with direct TD sampling, FFT operation, pattern removal (e.g., phase elimination), and differential encoding may be avoided. In some scenarios, high SNR regions may be associated with higher minimum binary representation lengths per sample to avoid E2E scheme performance loss, for example, due to a quantization noise floor. Thus, the quantization scheme complexity and binary representation length for DL RS samples may be adjusted adaptively to the operational SNR point. Additionally, the quantization scheme complexity and binary representation length for DL RS samples may be reduced for lower SNR scenarios, and may be increased for higher SNR scenarios.

Aspects disclosed herein provide techniques for addressing different types of dynamic adaptations for DL RS sampling, quantization, and indication/reporting procedures. In some aspects, the dynamic adaptations may be a function of at least one of operation SNR and channel characteristics. In some aspects, the disclosed adaptive type of operation may facilitate lowering or minimizing DL RS samples indication overhead in uplink. The disclosed adaptive type of operation may also facilitate lowering or minimizing receiver-side complexity associated with DL RS samples processing schemes for UL indication/reporting.

In some aspects, the different types of dynamic adaptations for DL RS sampling, quantization, and indication/reporting procedures may be impacted by one or more additional, or alternate, factors. For example, in some scenarios, the DL RS allocation or sampling density in the frequency domain may impact the disclosed adaptive type of operation. Additionally, or alternatively, the UL resources size adaptation to quantization scheme parameterization (e.g., the UL container size) may impact the disclosed adaptive type of operation. In some examples, the DL RS samples refresh/reporting rate (e.g., the DL RS and report periodicity) may additionally, or alternatively, impact the disclosed adaptive type of operation. As another example, control signaling may additionally, or alternatively, impact the disclosed adaptive type of operation.

As disclosed above, efficient and low complexity sample quantization may be achieved using differential quantization (in the frequency domain (FD)) and a Max-Lloyd non-uniform quantizer (for both time domain (TD) and FD).

Figure 10:
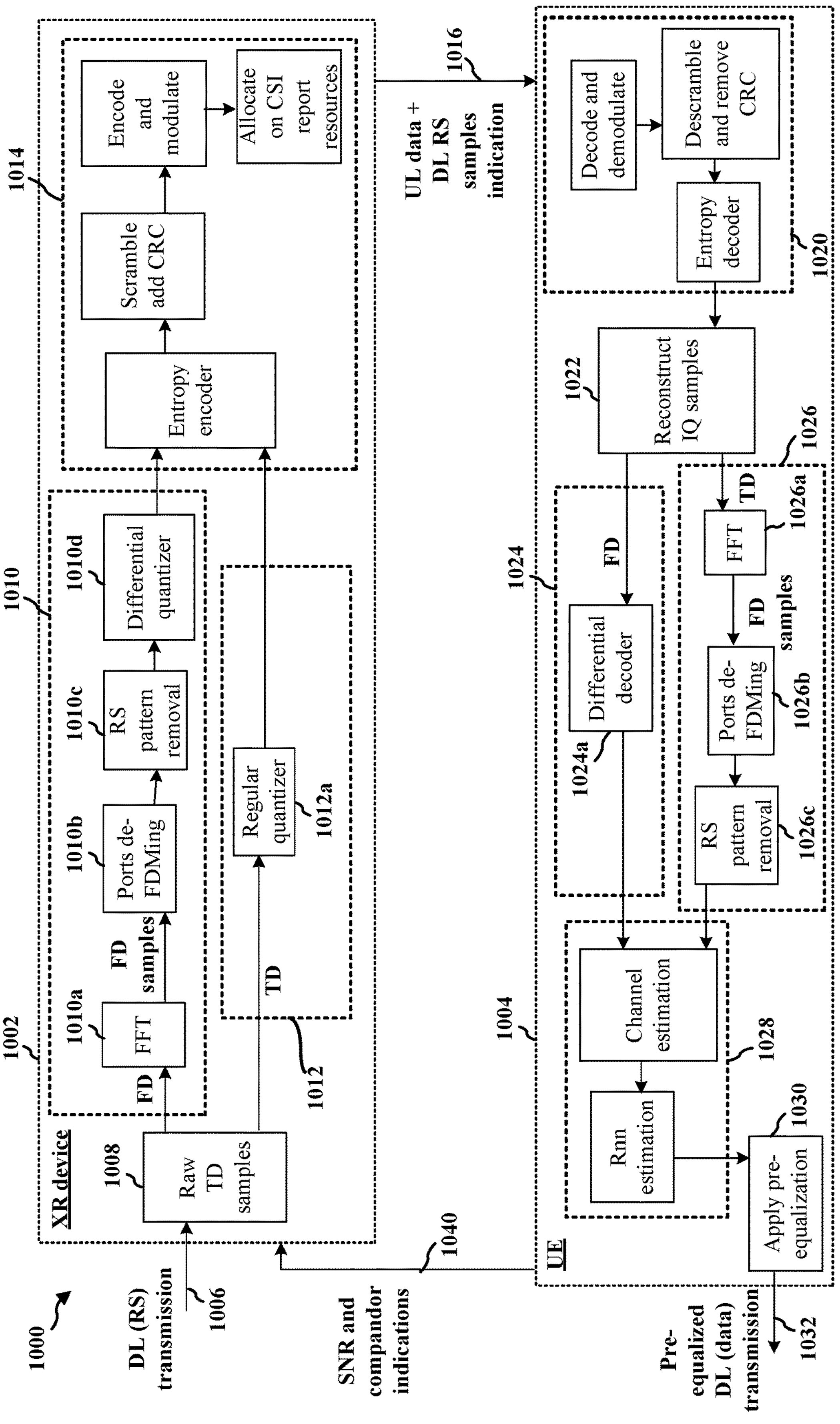
FIG. 10 is a block diagram illustrating a DL RS processing flow between an XR device and a companion device, in accordance with various aspects of the present disclosure.

FIG. 10 is a block diagram illustrating a DL RS processing flow 1000 between an XR device 1002 ("XR") and a companion device 1004 ("UE"), as presented herein. The example DL RS processing flow 1000 includes DL RS sampling, quantization, and reconstruction. In the example of FIG. 10, the XR device 1002 receives a downlink RS transmission 1006. The downlink RS transmission 1006 may be output (e.g., provided) by the companion device 1004. The XR device 1002 performs a sampling procedure and obtains raw TD samples 1008. As shown in FIG. 10, the XR device 1002 includes two example quantization flows based on whether the XR device 1002 is configured to perform FD quantization or TD quantization. For example, the XR device 1002 may perform an XR FD quantization flow 1010 when configured to perform FD quantization on the raw TD samples 1008. In another example, the XR device 1002 may perform an XR TD quantization flow 1012 when configured to perform TD quantization on the raw TD samples 1008. The XR device 1002 may then perform processing procedures 1014 on the output of the XR FD quantization flow 1010 or the XR TD quantization flow 1012 to obtain UL traffic 1016. The processing procedures 1014 may include one or more of entropy encoder procedures, scramble and add cyclic redundancy check (CRC) procedures, encode and modulate procedures, and allocate on CSI report resources procedures. The example UL traffic 1016 may include UL data and/or DL RS samples indication.

In the illustrated example of FIG. 10, the XR FD quantization flow 1010 includes performing FFT operations 1010*a* on the raw TD samples 1008 to obtain FD samples. The XR FD quantization flow 1010 also includes performing DL RS ports demultiplexing procedures 1010*b* ("Ports De-FDMing"), RS pattern removal procedures 1010*c*, and differential quantizer procedures 1010*d*. The differential quantizer procedures 1010*d* may include differential Max-Lloyd quantization, which may be associated with a low complexity and, thus, facilitate a relatively low processing complexity at the XR device 1002.

In examples in which the XR device 1002 is configured to perform TD quantization, the XR device 1002 may perform the XR TD quantization flow 1012. As shown in FIG. 10, the XR TD quantization flow 1012 includes quantizer procedures 1012*a* ("Regular Quantizer"). The quantizer procedures 1012*a* may include performing Max-Lloyd quantization, which may be associated with a negligible processing complexing at the XR device 1002.

At the companion device 1004, the companion device 1004 may obtain the UL traffic 1016 from the XR device 1002. The companion device 1004 may perform processing procedures 1020 on the UL traffic 1016. The processing procedures 1020 may include one or more of decode and demodulate procedures, descramble and remove CRC procedures, and entropy decoder procedures. The companion device 1004 may then perform one or more reconstruction procedures on the output of the processing procedures 1020 to obtain reconstructed samples 1022 ("Reconstruct IQ samples"). The reconstructed samples 1022 may include FD samples or TD samples. Similar to the XR device 1002, the companion device 1004 may perform one of two example quantization flows based on whether the companion device 1004 is configured to perform FD quantization or TD quantization. For example, the companion device 1004 may perform a UE FD quantization flow 1024 when configured to perform FD quantization on the reconstructed samples 1022. In another example, the companion device 1004 may perform a UE TD quantization flow 1026 when configured to perform TD quantization on the reconstructed samples 1022. The output of the UE FD quantization flow 1024 or the UE TD quantization flow 1026 may be provided to estimation procedures 1028. The estimation procedures 1028 may include channel estimation procedures and $R_{nn}$ estimation procedures. The companion device 1004 may use the output of the estimation procedures 1028 to apply pre-equalization procedures 1030 and to generate DL traffic 1032. The example DL traffic 1032 may include a pre-equalized DL transmission. In some examples, the pre-equalized DL transmission may include data.

In examples in which the companion device 1004 is configured to perform FD quantization, the companion device 1004 may perform the UE FD quantization flow 1024 on the reconstructed samples 1022. As shown in FIG. 10, the UE FD quantization flow 1024 includes differential decoder procedures 1024*a*.

In other examples, the companion device 1004 may be configured to perform TD quantization and, thus, may apply the UE TD quantization flow 1026 to the reconstructed samples 1022. In the illustrated example of FIG. 10, the UE TD quantization flow 1026 includes performing FFT operations 1026*a* on the reconstructed samples 1022 to obtain FD samples. The UE TD quantization flow 1026 also includes performing ports demultiplexing procedures 1026*b* ("Ports De-FDMing"), and RS pattern removal procedures 1026*c*.

Although not shown in the illustrated example of FIG. 10, the companion device 1004 may provide the DL traffic 1032 to the XR device 1002 for presentment by the XR device 1002.

In some examples employing a differential quantizer, to facilitate reconstructing the samples at the companion device 1004 (e.g., the reconstructed samples 1022), the XR device 1002 may signal the first sample, which may be non-differentially quantized, of the non-differential data to the companion device 1004. In some such examples, the signaled first sample may facilitate the companion device 1004 to perform non-differential sample vector reconstruction procedures and to obtain the reconstructed samples 1022.

In some examples, the XR device 1002 may apply one or more modifications to information before performing differential quantizer procedures. For example, to obtain normalized samples variance, which may improve efficient quantization, the XR device 1002 may apply samples normalization/scaling procedures, which may include local adaptive gain control (AGC) or scaling components. In some such examples, the XR device 1002 may signal to the companion device 1004 the one or more modifications applied by the XR device 1002. For example, the XR device 1002 may include an indication of the one or more modifications with the UL traffic 1016. The companion device 1004 may use the signaling received from the XR device 1002 to apply reverting or scaling-back procedures when performing the samples reconstruction procedures. In some such examples, the power level of the reconstructed samples 1022 may represent the actual signal and channel response experienced by the downlink RS transmission 1006 when received by the XR device 1002.

Figure 11:
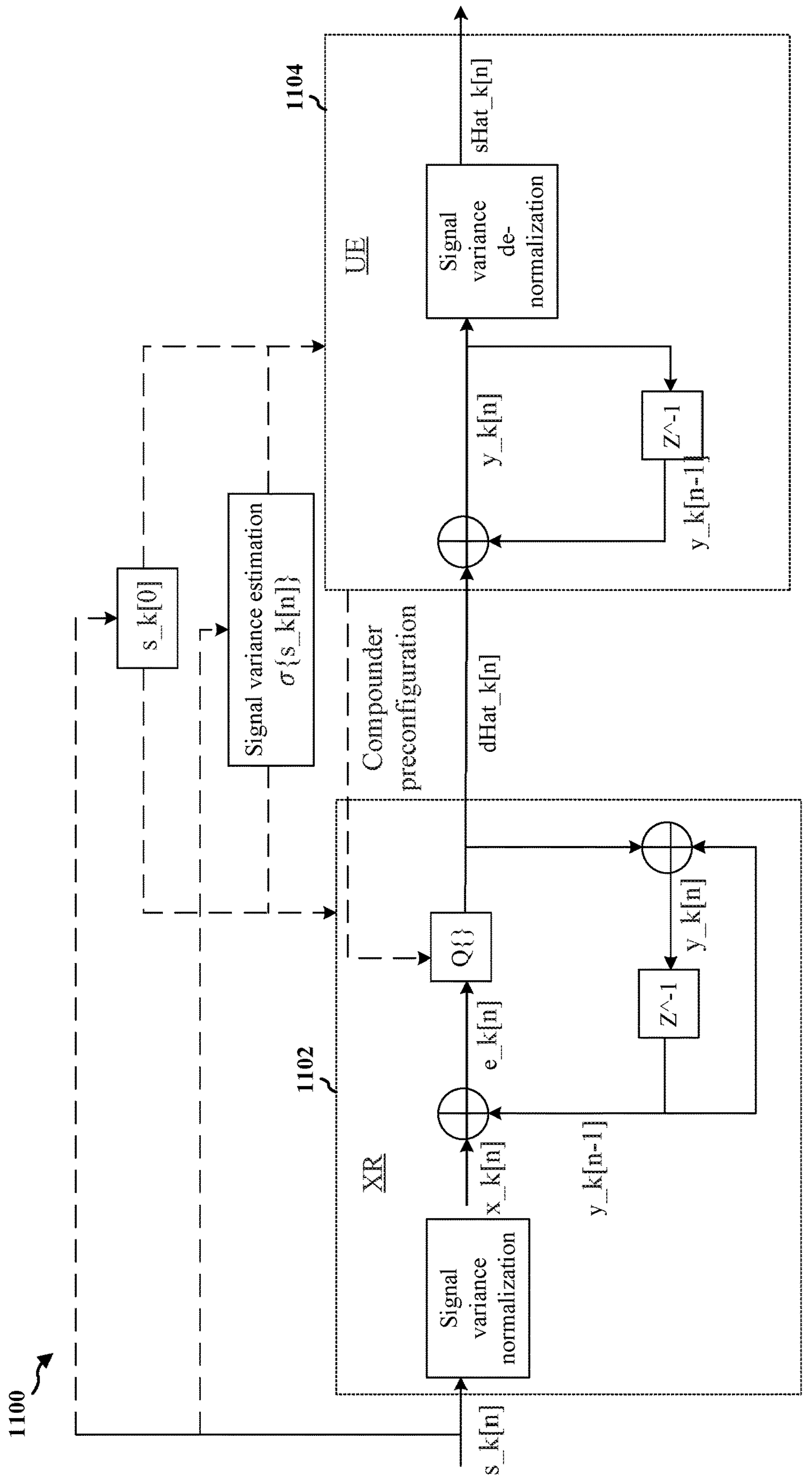
FIG. 11 illustrates an example diagram of processing at an XR device and a UE, in accordance with various aspects of the present disclosure.

In the illustrated example of FIG. 10, the differential quantizer may be based on a differential post-code modulation (DPCM) scheme. FIG. 11 illustrates an example diagram 1100 of processing at an XR device 1102 and a UE 1104, as presented herein. In FIG. 11, $s_k[n]$ is an example DL RS input signal in a frequency domain corresponding to the $k^{th}$ port, and $\sigma s_k$ is its estimated standard deviation to scale its variance to some fixed assumed value, e.g., 1. The reconstructed sample (e.g., the output of the quantization process) is represented as $\hat{s}_k[n]$. The Max-Lloyd quantizer $Q\{\cdot\}$ has non-uniform quantization levels determined based on the differential samples' distribution. The data variance may be estimated by the XR device 1102 per RS sample indication session, per DL RS port, and per Rx.

A Max-Lloyd quantizer may achieve a minimum squared quantization error for a given samples binary representation length (corresponding to a fixed number of quantization levels) by selecting optimal quantization levels values based on the sample distribution. For OFDM-based waveforms and the UWB channel with additive white Gaussian noise (AWGN), both raw TD samples and differential FD samples can be assumed to have a Gaussian distribution.

However, the raw TD samples and the different FD samples may have different characteristics. Time domain, or time division, data samples may have a slightly larger range than frequency domain, or frequency division, data samples due to a higher peak to average power ratio (PAPR) in the time domain. Differential frequency domain data samples may have a localized Gaussian distribution, whereas applying a differential operator on time domain data samples may not provide a more localized distribution shape for differential time domain samples due to a lack of correlation in the time domain.

The quantization of the RS in the time domain enables an FFT operation to be saved or skipped at the XR device receiver, e.g., in contrast to frequency domain based sampling. However, for mid to high SNR circumstances, the frequency domain data samples after pattern removal may be more correlated (due to the frequency domain channel correlation), which enables a differential quantizer to be applied with fewer quantization levels (corresponding to a shorter binary representation of quantized data). In this example, the frequency domain based quantization can be more efficient in terms of samples indication report size and/or control data overhead for the corresponding SNR and channel characteristics.

In some aspects, based on the Gaussian distribution of the samples, it may be beneficial to use a non-uniform quantizer. However, as the distribution of the DL RS samples may depend on operational SNR, aspects disclosed herein facilitate updating one or more quantization scheme parameters, such as whether to employ non-differential TD sampling or differential FD sampling (e.g., a type of quantization scheme), a sampling scheme (e.g., a time domain quantization or a frequency domain quantization), an FD channel correlation for FD sampling, Max-Lloyd quantization levels, a number of quantization levels/binary representation length per sample, optimal quantization levels distribution, corresponding compandor/de-compandor function selection, a report size (e.g., a number of bits for the representation), CSI refresh related parameters (e.g., a reference signal allocation period or report resource allocation/reservation), a frequency domain sampling rate, etc. In some examples, the one or more quantization scheme parameters may be updated based on one or more of an SNR sub-range, channel correlation, and TD/FD sampling scenario/option. In some examples, the UE may signal an adaptation (e.g., a dynamic adaptation) of the one or more quantization scheme parameters.

In some aspects, the UE may additionally, or alternatively, signal Max-Lloyd-related parameters and/or configurations. In some examples, the Max-Lloyd-related parameters/configurations may include Max-Lloyd quantization levels. Max-Lloyd quantization levels may be determined, for example, iteratively based on a known samples distribution. In a first illustrative example, the Max-Lloyd quantization levels may be defined offline. For example, the Max-Lloyd quantization levels may be determined based on a-priory samples distribution knowledge (or assumption). In some such examples, the a-priory samples distribution knowledge may depend on FD channel correlation and/or operational SNR sub-range assumptions. In a second illustrative example, the Max-Lloyd quantization levels may be adapted online. For example, optimal Max-Lloyd quantization levels may be dynamically tracked/evaluated based on previous DL RS samples from one or more nearest past indications.

Figure 12A:
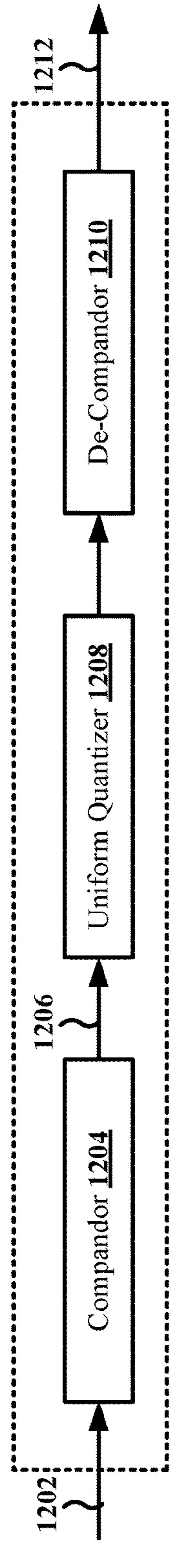
FIG. 12A illustrates an example implementation of a Max-Lloyd quantizer, in accordance with various aspects of the present disclosure.
Figure 12B:
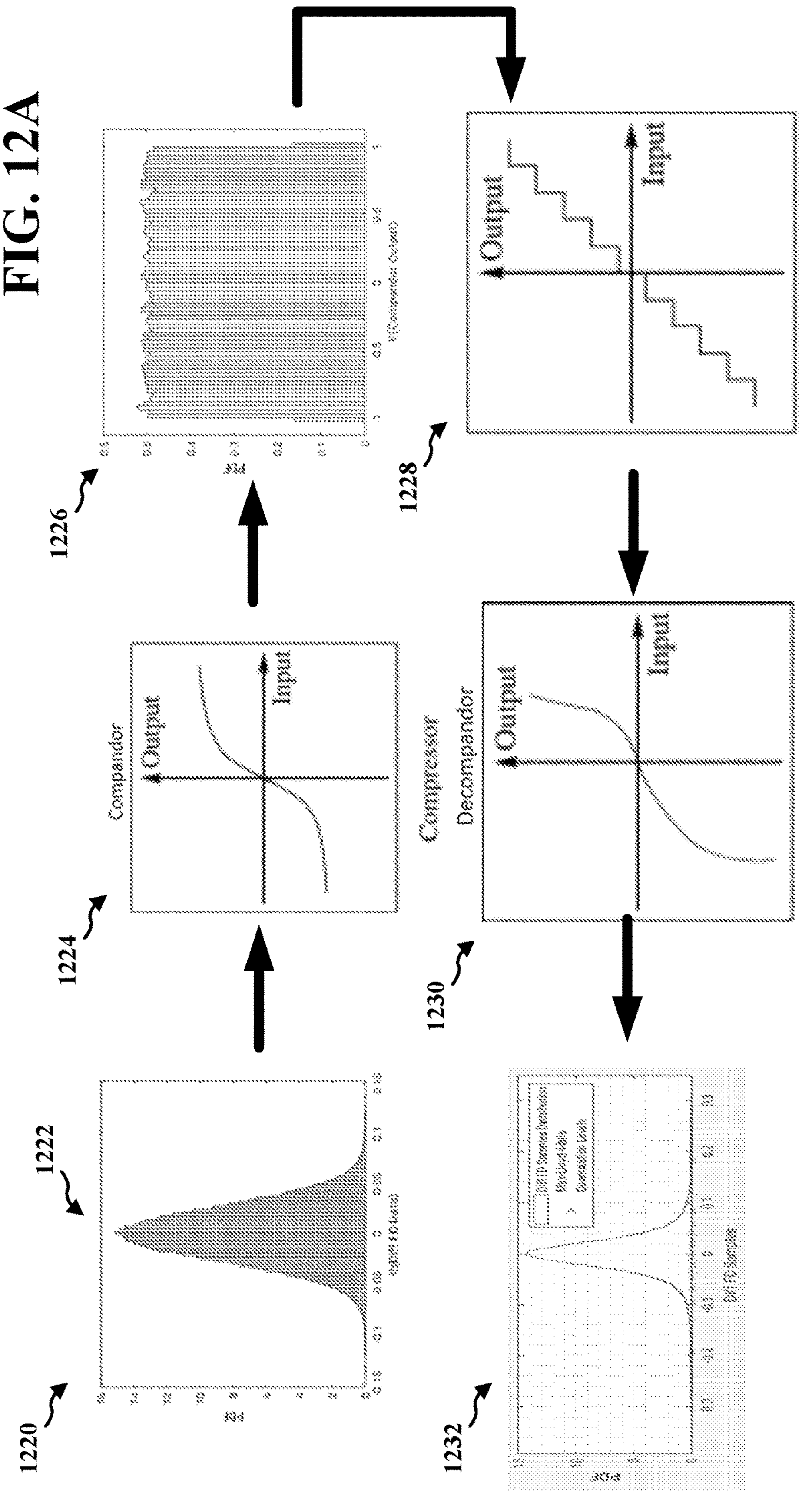
FIG. 12B is a diagram illustrating a representation of data and functions of the Max-Lloyd quantizer of FIG. 12A, in accordance with various aspects of the present disclosure.

In some aspects, a Max-Lloyd quantizer (or a non-uniform quantizer) may be implemented via a compandor, a uniform quantizer, and a de-compandor. FIG. 12A illustrates an example implementation of a Max-Lloyd quantizer 1200, as presented herein. The Max-Lloyd quantizer 1200 of FIG. 12A includes a compandor 1204, a uniform quantizer 1208, and a de-compandor 1210. FIG. 12B is a diagram 1220 illustrating a representation of data and functions of the Max-Lloyd quantizer 1200 of FIG. 12A, as presented herein. In some aspects, dynamic adaptation of Max-Lloyd quantization levels distribution may be performed via dynamic adaptation of the compandor function and the de-compandor function employed by the compandor 1204 and the de-compandor 1210, respectively.

In the illustrated example of FIG. 12A, the Max-Lloyd quantizer 1200 receives input data 1202. The input data 1202 may include differential FD samples. The input data 1202 may have a Gaussian distribution, as shown in a first representation 1222 of FIG. 12B. The compandor 1204 may manipulate the input data 1202 and generate compandor output 1206. The compandor 1204 may apply a compandor function, as shown in a second representation 1224 of FIG. 12B. In some aspects, the compandor 1204 may also be referred to as a compressor. In some examples, when compared to the input data 1202, the compandor output 1206 output by the compandor 1204 may have a uniform distribution, as shown in a third representation 1226 of FIG. 12B.

In the illustrated example of FIG. 12A, the uniform quantizer 1208 applies a function to the compandor output 1206. As an example, the uniform quantizer 1208 may apply a step function to the compandor output 1206, as shown in a fourth representation 1228 of FIG. 12B.

In the illustrated example of FIG. 12A, the de-compandor 1210 receives the output of the uniform quantizer 1208. The de-compandor 1210 may manipulate the output of the uniform quantizer 1208 and generate a Max-Lloyd output 1212. The de-compandor 1210 may apply a de-compandor function, as shown in a fifth representation 1230 of FIG. 12B. In some aspects, the de-compandor 1210 may also be referred to as an expander. In the illustrated examples of FIG. 12A and FIG. 12B, the de-compandor function is an inverse of the compandor function. The Max-Lloyd output 1212 output by the de-compandor 1210 include a quantized Gaussian distribution, as shown in a sixth representation 1232 of FIG. 12B.

Referring again to the example DL RS processing flow 1000 of FIG. 10, when the compandor function and the de-compandor function are each known to the companion device 1004 and the XR device 1002, the companion device 1004 may generate reconstructed samples 1022 that are consistent, with respect to at the XR device 1002. For example, the companion device 1004 may select (e.g., dynamically select) a compandor function and a de-compandor function. The companion device 1004 may then signal the selected compandor function and de-compandor function to the XR device 1002, for example, via control signaling.

In some aspects, a parameters configuration may define a compandor function and a de-compandor function based on one or more factors. The parameters configuration may be configured (or pre-configured), for example, via offline calculations. The parameters configuration may be defined (or pre-defined) at the XR device 1002 and the companion device 1004. In some aspects, different compandor functions and de-compandor functions may be mapped to different indices. Additionally, the different indices may be mapped to one or more factors, such as channel statistics (e.g., for different UWB channel types) and/or different operational SNR points/subranges per non-differential TD sampling/differential FD sampling. In some aspects in which TD sampling is employed, a per waveform factor may also be used for mapping the different indices.

In some aspects, the companion device 1004 may select a parameter configuration (e.g., an index value) based on one or more of a current operational SNR point knowledge and previously indicated DL RS samples characteristics/distributions. As shown in FIG. 10, the companion device 1004 may output a communication 1040 that is received by the XR device 1002. In some examples, the communication 1040 may indicate a current operational SNR point. Additionally, or alternatively, the communication 1040 may indicate a compandor function and a de-compandor function. For example, the communication 1040 may indicate which compandor function and de-compandor function for the XR device 1002 to apply. In some examples, the indication of the compandor function and the de-compandor function may include an index value (e.g., from the parameter configuration).

In some examples, the compandor function and the de-compandor function may have a relation to each other. In some such examples, the de-compandor function may be derived based on the compandor function and the relationship, or vice versa. For example, in the examples of FIG. 12A and FIG. 12B, the de-compandor function is an inverse of the compandor function. In some such examples, the de-compandor function may be derived by applying an inverse function to the compandor function. Thus, in some examples, the communication 1040 may include an indication of one of the compandor function or the de-compandor function, and the XR device 1002 may determine the other one of the compandor function or the de-compandor function.

In some aspects, time and/or frequency selective interference may impact the one or more quantization scheme parameters of a chosen quantization scheme. In some such examples, if the companion device 1004 has access to information about interference (e.g., interference presence and/or characteristics of interference), the companion device 1004 may use the interference information to choose the quantization scheme and to select the one or more quantization scheme parameters. For example, based on interference information (or the lack thereof), the companion device 1004 may select a differential/non-differential quantization scheme, a number of bits representation, a compandor function, etc.

As described above, a Max-Lloyd quantizer may be associated with a quantization level, which may also be referred to as a sampling level, in some examples. The quantization level may define a binary representation length of each I/Q sample. For example, a number of quantization levels used by the Max-Lloyd quantizer may correspond to a number of bits used for each sample representation. That is, increasing the number of quantization levels increases the number of bits used for each sample representation, while decreasing the number of quantization levels decreases the number of bits used for each sample representation. A higher number of quantization levels used by the quantizer may lower likelihood of an added quantization error, but may also increase signaling overhead as a higher signaling volume may be used for the uplink traffic providing the DL RS samples indication and/or reporting. That is, as the number of quantization levels increases, the number of bits used for each sample representation increases, and the size (e.g., volume) of the UL traffic 1016 of FIG. 10 also increases. In contrast, decreasing the number of quantization levels may increase the likelihood of an added quantization error, but may also decrease overhead of the signaling from the XR device 1002 to the companion device 1004.

Thus, there may be scenarios for when using a higher number of quantization levels may be preferred to using a lower number of quantization levels, and vice versa. For example, performance of an E2E transmission pre-equalization scheme may change based on SNR. For example, in scenarios with high SNR, the companion device 1004 may determine that the likelihood of performance degradation of the E2E transmission pre-equalization scheme may increase. Thus, the companion device 1004 may determine to lower the likelihood of added quantization error for each sample representation by increasing the number (or selecting a large number) of bits used for each sample representation. However, as disclosed above, increasing the number of bits used for each sample representation also increases the volume of the UL traffic 1016 used to deliver the DL RS samples indication/report.

In scenarios with low SNR, thermal noise may impact the likelihood of performance degradation more than the likelihood of added quantization errors. For example, a higher likelihood of added quantization error may have a negligible level of performance degradation of the E2E transmission pre-equalization scheme. Thus, the companion device 1004 may determine that higher likelihoods of added quantization errors are tolerable and, thus, may determine to decrease the number (or select a smaller number) of bits used for each sample representation, which may also correspond to a lower volume of the UL traffic 1016 used to determine the DL RS samples indication/report.

Thus, aspects disclosed herein facilitate employing an adaptive configuration for samples binary representation length (or for the number of quantization levels) to facilitate efficient DL RS samples processing and reporting procedures. With respect to SNR, scenarios with good SNR conditions correspond to a higher UL link capacity, while scenarios with bad SNR conditions correspond to a lower UL link capacity. Thus, by adapting the one or more quantization scheme parameters (e.g., the number of quantization levels) of a chosen quantization scheme, aspects disclosed herein facilitate minimizing UL control signaling overhead (e.g., the size (or volume) associated with the DL RS samples indication/report). Additionally, an adaptive quantizer (e.g., based on the one or more quantization scheme parameters) facilitates reducing variability in the size (or volume) of the DL RS samples indication/report (e.g., due to link conditions) and may keep the size (or volume) of the UL traffic 1016 bounded. For example, to keep the size (or volume) of the DL RS samples indication/report consistent (or within a range), the aspects disclosed herein facilitate adapting the number of quantization levels (and the samples binary representation length) accordingly.

In some aspects, the XR device 1002 may determine (e.g., dynamically determine) a minimum number of bits per sample representation (which may also be referred to as an I/Q sample) based on one or more of a last used modulation and coding scheme (MCS) in downlink (e.g., from the companion device 1004 to the XR device 1002), on a post-processing SNR (ppSNR), or an equivalent metric that is evaluated locally by the XR device 1002. Additionally, or alternatively, the companion device 1004 may indicate (e.g., dynamically indicate) the minimum number of bits per sample representation based on analysis of one or more previous DL RS samples and/or an SNR estimation for downlink.

In some aspects, the XR device 1002 may be configured (or pre-configured) with a default configuration indicating a maximal number of representation bits (e.g., number of bits per each sample representation) to apply for a first/initial DL RS samples indication. For example, for a first/initial DL RS samples indication, there may be no DL RS samples history or received pre-equalized DL data transmission. Thus, the default configuration may indicate a maximal number of representation bits assuming the SNR is at the upper edge of an operational SNR range.

In some scenarios in which the default configuration includes a high number of representation bits, the XR device 1002 may determine to apply non-differential TD quantization for the first/initial DL RS samples indication. Additionally, or alternatively, the XR device 1002 may determine to apply a degenerated compandor response for the first/initial DL RS samples indication. In some examples, based on the default configuration, the XR device 1002 may apply a uniform quantization until an operational SNR subrange is unknown for the first/initial DL RS samples indication.

For subsequent DL RS samples indications (e.g., after the first/initial DL RS samples indication), the one or more quantization scheme parameters may be adapted in view a previous DL RS samples indication. For example, the one or more quantization scheme parameters may be adapted based on an actual operational SNR evaluation of a previous DL RS samples indication.

It may be appreciated that different combinations of the one or more quantization scheme parameters may change the performance results of an E2E transmission pre-equalization scheme. For example, as one example, different DL RS quantization options (e.g., TD samples-based or FD samples based) may change the performance results. As another example, whether a differential encoder is included or not included may change the performance results. As another example, whether uniform or non-uniform quantization (Max-Lloyd quantization) is applied may change the performance results. In another example, different binary samples representation lengths may change the performance results. Thus, aspects disclosed herein facilitate adapting different options and parameters of the one or more quantization scheme parameters to account for different SNR subranges, which may facilitate a maximally efficient and robust DL RS sampling and quantization scheme.

As an example, for an FD differential Max-Lloyd quantizer, a 1-bit quantization (per I/Q sample) may be used when SNR is less than 18 [dB] (e.g., SNR<18 [dB]), which may include the practical SNR range for UWB sidelink. For a TD non-differential Max-Lloyd quantizer, up to 3-bit quantization (per I/Q sample) may be used for SNR less than 19 [dB] (e.g., SNR<19 [dB]). Additionally, a 1-bit quantization (per I/Q sample) may be used for a lower SNR range, such as when SNR is less than 9 [dB] (e.g., SNR<9 [dB]).

Thus, an adaptive hybrid scheme employing FD differential Max-Lloyd quantization and TD non-differential Max-Lloyd quantization may apply 1-bit TD non-differential Max-Lloyd quantization when SNR is less than 9 [dB] (e.g., SNR<9 [dB]), may apply 1-bit FD differential Max-Lloyd quantization when SNR is greater than or equal to 9 [dB] and less than 19 [dB] (e.g., 9 [dB]≤SNR<19 [dB]), and may apply 2-bit FD differential Max-Lloyd quantization when SNR is greater than or equal to 19 [dB] (e.g., SNR≥19 [dB]). Another representation of the adaptive hybrid scheme based on SNR is illustrated in Table 2 (below).

TABLE 2

| SNR | Quantization level to apply |
|---|---|
| SNR < 9[dB] | 1-bit TD non-differential Max-Lloyd quantization |
| 9[dB] ≤ SNR < 19[dB] | 1-bit FD differential Max-Lloyd quantization |
| SNR ≥ 19[dB] | 2-bit FD differential Max-Lloyd quantization |

In some aspects, the uplink overhead (e.g., the size (or volume) of the UL traffic 1016) may be a function of SNR. In some such examples, a CSI refresh period may be SNR dependent to reduce DL RS samples indication overhead in low SNR scenarios. In some examples, DL RS samples resolution in FD may be SNR and FD channel correlation dependent, which may further reduce DL RS samples indication overhead, especially for the lowest SNR edge. In some aspects, the techniques disclosed herein may facilitate reducing UL overhead related to CSI refresh periods while preserving performance of an E2E transmission pre-equalization scheme at the same (or similar) level as without applying quantization.

For the addressed example, usage of adaptive quantization scheme as suggested by this proposal, allows to reduce UL OH related to CSI refresh by at least up to times 4 factor while preserving E2E scheme performance at the same level as w/o quantization.

Aspects disclosed herein provide techniques employing an adaptive hybrid sampling and quantization scheme for DL RS samples indication/reporting with low UL signaling overhead. Such a scheme may facilitate allowing relatively frequency CSI refresh procedures for transmission-side equalized transmission (e.g., from the companion device, such as a UE) and a low complexity receiver (e.g., the XR device).

Although the disclosed techniques are described in context of low power and low complexity UWB-based XR sidelink, the concepts may also be applicable for additional, or alternate, scenarios, such as other power/battery limited device scenarios, link type, frequency band, XR application, etc.

Figure 13:
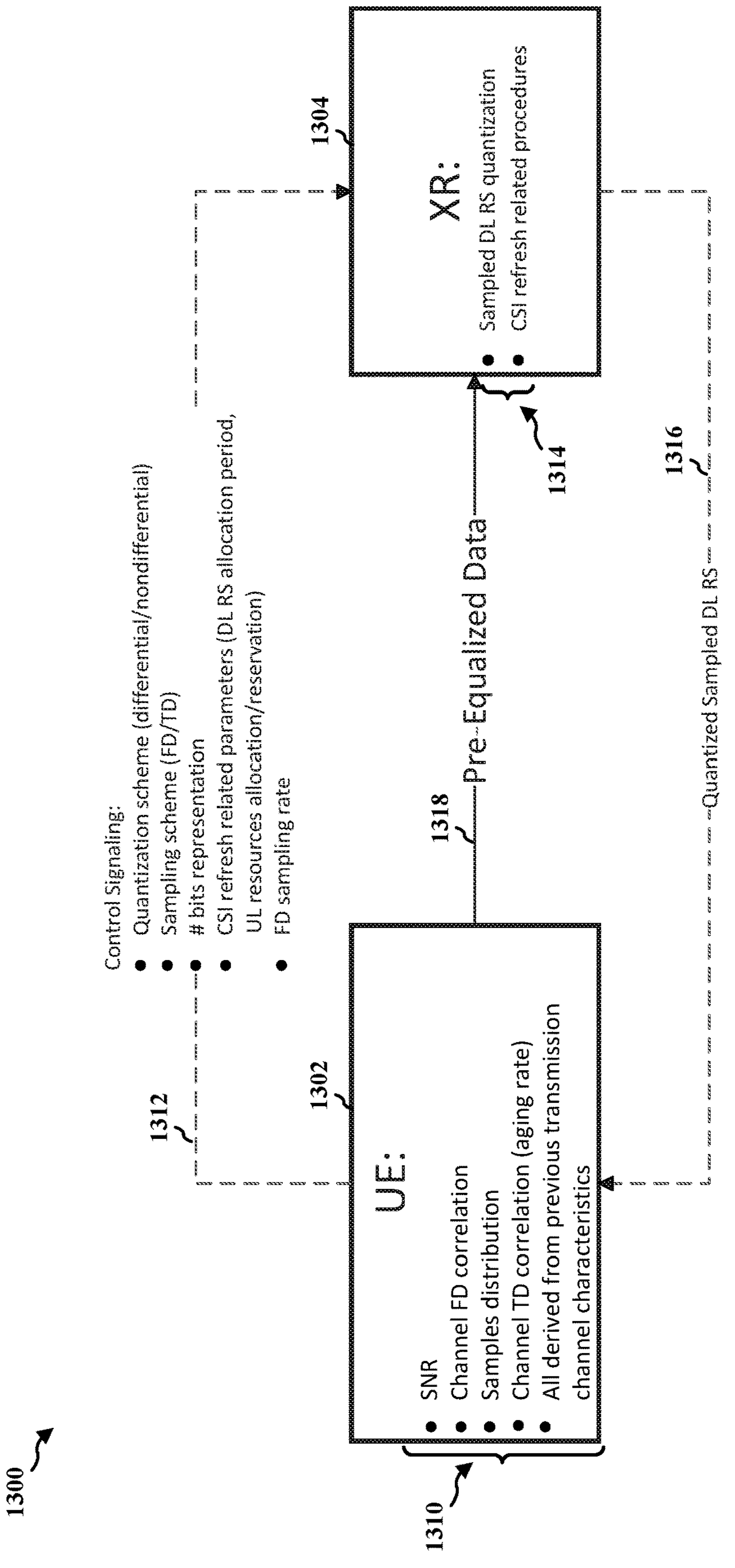
FIG. 13 is an example communication flow between an XR device and a UE, in accordance with various aspects of the present disclosure.

FIG. 13 illustrates an example of signaling 1300 between a UE 1302 and an XR device 1304 device including quantization at the XR device. FIG. 13 shows that the UE 1302 may know SNR and channel characteristics (e.g., a DL SNR and DL channel characteristics for a downlink channel between the UE and the XR device) based on the previous channel and noise estimations from the XR device. Although examples as described for a downlink reference signal from the UE, the reference signal may be a sidelink reference signal and the XR device may provide the quantized measurement information as a sidelink transmission.

The XR device provides downlink sample information, and the UE can obtain various information, including an SNR, a channel frequency domain correlation, a sample distribution, a time domain correlation for the channel (e.g., an aging rate), among other information that the UE derives from previous XR device transmissions about the channel characteristics.

The UE 1302 uses the information to select quantization scheme parameters (e.g., a type of quantization scheme (differential or non-differential), a sampling scheme (e.g., a time domain or frequency domain quantization), a number of quantization levels/binary representation length per sample, optimal quantization levels distribution, corresponding compandor/de-compandor function selection, a report size (e.g., a number of bits for the representation), CSI refresh related parameters (e.g., a reference signal allocation period or report resource allocation/reservation), or a frequency domain sampling rate). The UE signals the quantization scheme parameters to the XR device 1304. The UE uses the quantized samples received based on the signaled quantization parameters to estimate the channel between the UE and the XR device and to update the quantization parameters accordingly. This enables the UE to dynamically signal the quantization configuration to the XR device 1304 to support adaptive quantization.

As one example of a quantization parameter, the UE may select, and indicate to the XR device 1304, a reference signal allocation or sampling density in a frequency domain. The UE 1302 may select the reference signal allocation/sampling density as a function of the SNR and channel correlation. As an example, with a lower SNR, higher channel estimation errors can be afforded without impacting performance. Therefore, a lower frequency domain sampling rate (e.g., lower samples density) can be used when there is a lower SNR or for a more correlative channel. The reduced density can save overhead for the transmission of the reference signal, for example. If there is a higher SNR, the frequency domain sampling rate/sample density may be increased.

As well, when there is a lower SNR, DM-RS REs can be also allocated with a lower density which allows the DM-RS REs to be boosted according to the frequency domain decimation factor. Boosting DM-RS REs at low SNR instead of a higher density in the frequency domain may be more beneficial for channel estimation, e.g., for frequency selective channels. As an example, boosting applied on DM-RS REs may be limited to per 1 [MHz] equivalent isotropic radiated power (EIRP) restriction budget so that even if the DM-RS pattern is very sparse, boosting may only be performed only up to full 1 [MHz] power utilization/limit. For example, with an RE density of one RE per two RBs, boosting may be allowed by a factor of 8 for a 120 [KHz] SCS, for example, and not by a factor or 24.

As another example of a quantization parameter, the UE may select, and indicate to the XR device 1304, an uplink resource size adaptation to quantization scheme parametrization (e.g., an UL container size) for the report to the UE. Although the example is described for an uplink resource size, the XR device may also provide the report over sidelink, and the UE may indicate a sidelink resource size. Each time that the parameters of the quantization scheme are adjusted, the resources allocated for the report may be adjusted accordingly. For example, if one or more parameters of the quantization scheme that impacts a control data volume per indication/report are adjusted, the resources reservation/allocation (e.g., of uplink or sidelink resources) for these reports can be modified by the UE and indicated to the XR device. The reconfiguration of the report resources can be coupled with (e.g., provided to the XR device 1304 with) the quantization scheme reconfiguration of the one or more quantization parameters that led to the change in the report resources.

As another example of a quantization parameter, the UE may select, and indicate to the XR device 1304, a reference signal sample refresh/reporting rate (e.g., a RS+report periodicity). The reference signal may be a downlink reference signal from the UE 1302 or a sidelink reference signal from the UE 1302. As an example, the reference signal samples indication/report periodicity can be lower when there is a lower SNR because a more channel aging can be afforded without impacting performance under lower SNR conditions. As another example, the CSI refresh may be adapted (e.g., the UE may indicate a change at 1312) for equalized transmission in channel aging rate/mobility scenarios. In some scenarios and for some XR applications, there may be a limited mobility, whereas other cases may have a more interactive XR application with a relatively fast user head movement and/or user movements relative to the environment. For example, for display via XR glasses for enhanced working environment or movie watching where there is little to no user/user head movements, the CSI refresh related parameters may have a longer refresh rate (e.g., less frequent), and in the more interactive XR applications, a more frequent CSI refresh rate may be selected by the UE.

The sampling, quantization and CSI refresh related parameters/configurations may be changed dynamically and synchronously for both link sides (e.g., Tx and Rx), e.g., at the UE and the XR device.

The XR device 1304 performs reference signal quantization and CSI refresh related procedures, at 1314, based on the configuration signaled to the UE at 1312.

In some aspects, several sampling and quantization parameters can be bundled into defined or previously configured options (e.g., different potential options of a group of quantization parameters) that will be known to both UE and XR sides. The potential sets of quantization parameters (e.g., potential quantization parameter configurations) may be defined in a wireless standard, in some aspects. In other aspects, the UE may indicate the set of potential quantization parameters to the XR device. When the UE selects a particular quantization parameter configuration, the UE can signal an index for the corresponding configuration from the set of potential quantization parameter configurations in order to configure all the bundled parameters for the XR device 1304.

In some aspects, the reconfiguration of the quantization parameters can be provided in DCI, which allows for a per slot basis of the quantization parameters. In other aspects, the reconfiguration of the quantization parameters can be provided with a longer timing, such as in a medium access control-control element (MAC-CE).

Although the example for quantization of the sampled downlink reference signal and the equalization of data that is based on the quantized samples are presented using an example of XR traffic and an XR device as an example of a low power and low complexity device, the concepts may be similarly applied for other power/battery limited device scenarios, link types, frequency bands or applications.

The disclosed techniques facilitate reducing modem power consumption at the XR device (e.g., the receiver-side of the modem/link), for example, by "shifting" of the channel estimation and equalization related complexity and functionality from the XR device to its companion device/UE (e.g., the transmission-side of the link). Additionally, "shifting" the channel estimation and equalization related complexity and functionality to the companion device facilitates a simplified XR device modem hardware, a smaller XR device battery size, and a lower XR device weight. The disclosed adaptive hybrid sampling and quantization scheme supports aggressive complexity offloading from the XR device to the companion device, which brings the XR device closer to an "XR as I/O device" scenario and/or an "on the go" XR device.

In some aspects, the disclosed techniques facilitate DL RS samples indication with low uplink signaling overhead, for example, based on the adaptive hybrid sampling and quantization scheme. Such a scheme may facilitate relatively frequency CSI refresh procedures, which, thus, corresponds to a robust transmission-side pre-equalization-based scheme. Additionally, from the receiver-side (e.g., the XR device), the complexity of the CSI refresh procedures may be negligible.

Figure 14:
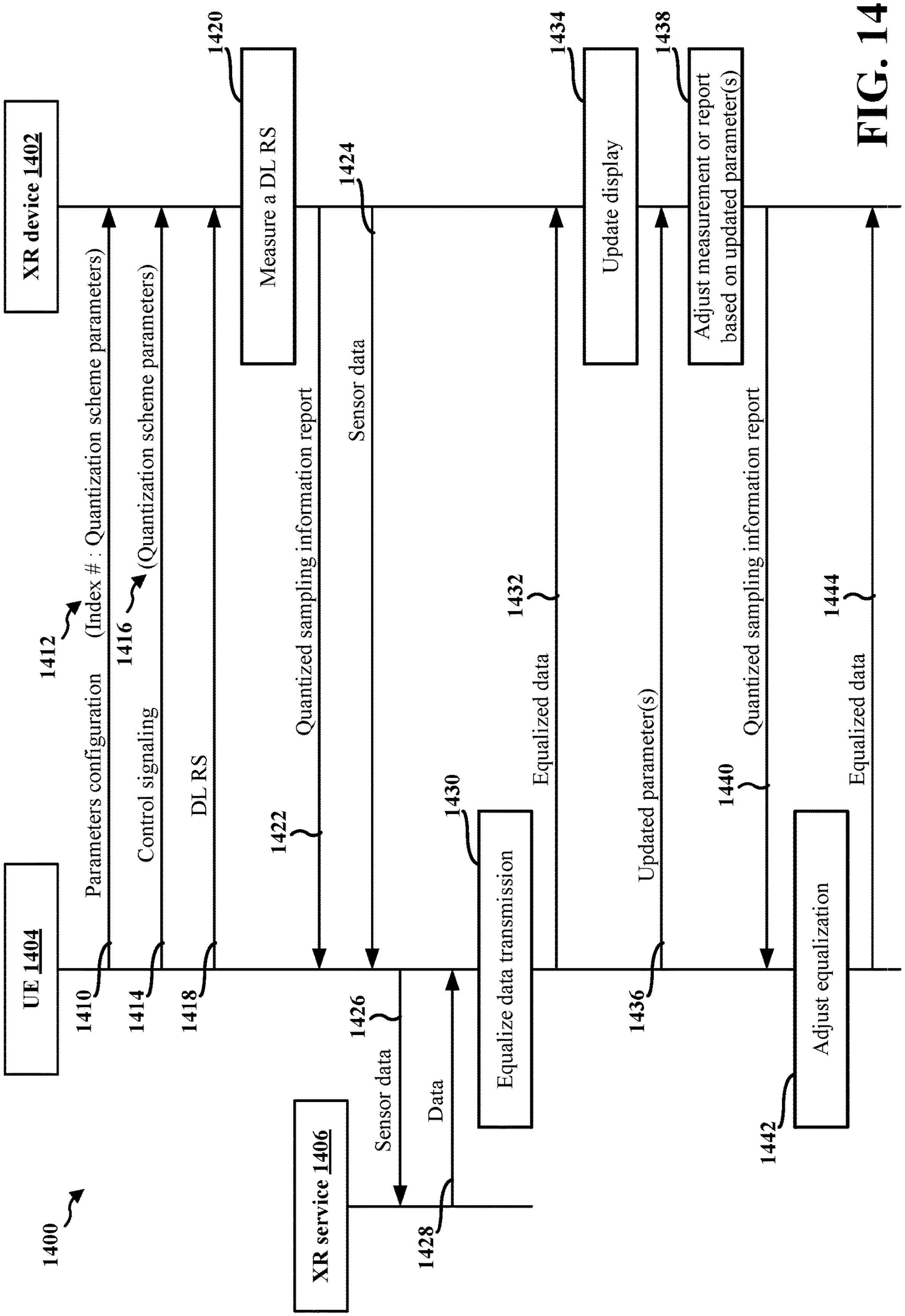
FIG. 14 is an example communication flow between an XR device and a UE, in accordance with various aspects of the present disclosure.

FIG. 14 illustrates an example communication flow 1400 between an XR device 1402 and a UE 1404, as presented herein. As illustrated in FIG. 14, the XR device may transmit and receive XR traffic with an XR service via companion device, such as the UE 1404. The UE may transmit and receive the XR traffic with the XR service via a wireless network, e.g., as FIGS. 1, 5, 6, and 8, for example.

In the illustrated example, the communication flow 1400 helps to reduce power consumption at the XR device 1402 and enables lower complexity in XR device hardware, smaller battery sizes at the XR device, and lower XR device weight while providing channel tracking to support pre-equalization of transmissions from the UE 1404 to the XR device 1402. Aspects of the XR device 1402 may be implemented by the XR device 350 of FIG. 3. Aspects of the UE 1404 may be implemented by the UE 104 of FIG. 1 and/or the UE 310 of FIG. 3.

The UE 1404 may transmit control signaling 1414 to the XR device 1402 indicating one or more quantization scheme parameters 1416 for the XR device 1402. The quantization scheme parameters may include one or more of a quantization scheme (e.g., differential or non-differential), a sampling scheme (e.g., in a frequency domain and/or time domain), a number of bits for the representation, a downlink reference signal allocation or a downlink reference signal density in a frequency domain, an uplink resource size (e.g., a number of bits) for reporting the quantized sampling information and/or a downlink reference signal sample and a report rate. In some aspects, the quantization parameters may be indicated with an index that refers to one of a set of defined or previously configured quantization parameter configurations. For example, the UE or another device such as a base station, may send a configuration 1410 to the XR device 1402 that indicates multiple potential quantization configurations, each having a corresponding index 1412. Then, the UE 1404 may indicate a particular index in the control signaling 1414 referring back to the set of potential configurations. The set of potential configurations may also be defined, such as in a wireless standard. FIG. 13 illustrates an example of potential information that may be included in the control signaling (e.g., at 1312). As described in connection with 1310 in FIG. 13, the UE may select the quantization parameters based on information that it has previously received from the UE.

The UE 1404 may transmit, and the XR device may receive a downlink reference signal 1418. The XR device measures the downlink reference signal at 1420 based on the one or more quantization scheme parameters 1416 indicated by the UE 1404. The one or more quantization scheme parameters may include at least one of a downlink reference signal allocation or a downlink reference signal density in a frequency domain, and the XR device 1402 may measure the downlink reference signal based on the at least one of the downlink reference signal allocation or the downlink reference signal density.

The XR device 1402 then transmits a quantized sampling information report 1422 to the UE 1404 based on the measurement of the downlink reference signal. The one or more quantization scheme parameters may include an uplink resource size for reporting the quantized sampling information, and the quantized sampling information may be reported in an uplink message having the uplink resource size. The one or more quantization scheme parameters may include a downlink reference signal sample and a report rate, and the quantized sampling information may be reported to the UE based on the downlink reference signal sample and the report rate. The one or more quantization scheme parameters may indicate resources in at least one of time and frequency for the downlink reference signal and for an uplink message to carry a report of the quantized sampling information. FIG. 13 illustrates an example of the XR device providing quantized sampled downlink reference signal information at 1316.

The UE 1404 may perform equalization, at 1430, on a data transmission for the XR device 1402 before transmitting the equalized data 1432. The equalization may be based on the quantized sampling information report 1422 received from the XR device 1402. FIG. 13 illustrates an example of a UE providing equalized data to the XR device, at 1318.

For example, the XR device 1402 may obtain sensor or camera data and provide the sensor/camera data 1424 to an XR service 1406 by transmitting it to the UE 1404, which transmits the sensor/camera data 1426 that it receives from the XR device 1402 to the XR service 1406 via a wireless network. The XR service returns data 1428 based on the sensor/camera data. Before sending the data 1428 to the XR device 1402, the UE 1404 processes the data to transmit an equalized data transmission to the XR device. The XR device may update a display, at 1434, based on the received data.

As conditions change, the UE 1404 may send an indication for the XR device to use at least one different quantization scheme parameter, e.g., at 1436. As one example, the UE 1404 may indicate a different index from the set of potential quantization scheme configurations. As another example, the UE 1404 may provide the XR device with a different combination of quantization scheme parameters. As another example, the UE 1404 may indicate a change of a subset of one of more parameters within the previously signaled quantization scheme parameters.

In response to receiving the update, the XR device 1402 may adjust the measurement of the downlink reference signal and/or the quantized sampling information report, at 1438. For example, the XR device may send a quantization sampling information report 1440 based on the updated quantization scheme parameters. The UE 1404 may adjust the equalization, at 1442, that the UE applies to the data before transmission to the XR device at 1444 based on the quantization sampling information report 1440. The UE 1404 may adjust the equalization for the data transmission based on different reports from the XR device, e.g., even if the reports are based on the same quantization scheme parameters.

Figure 15:
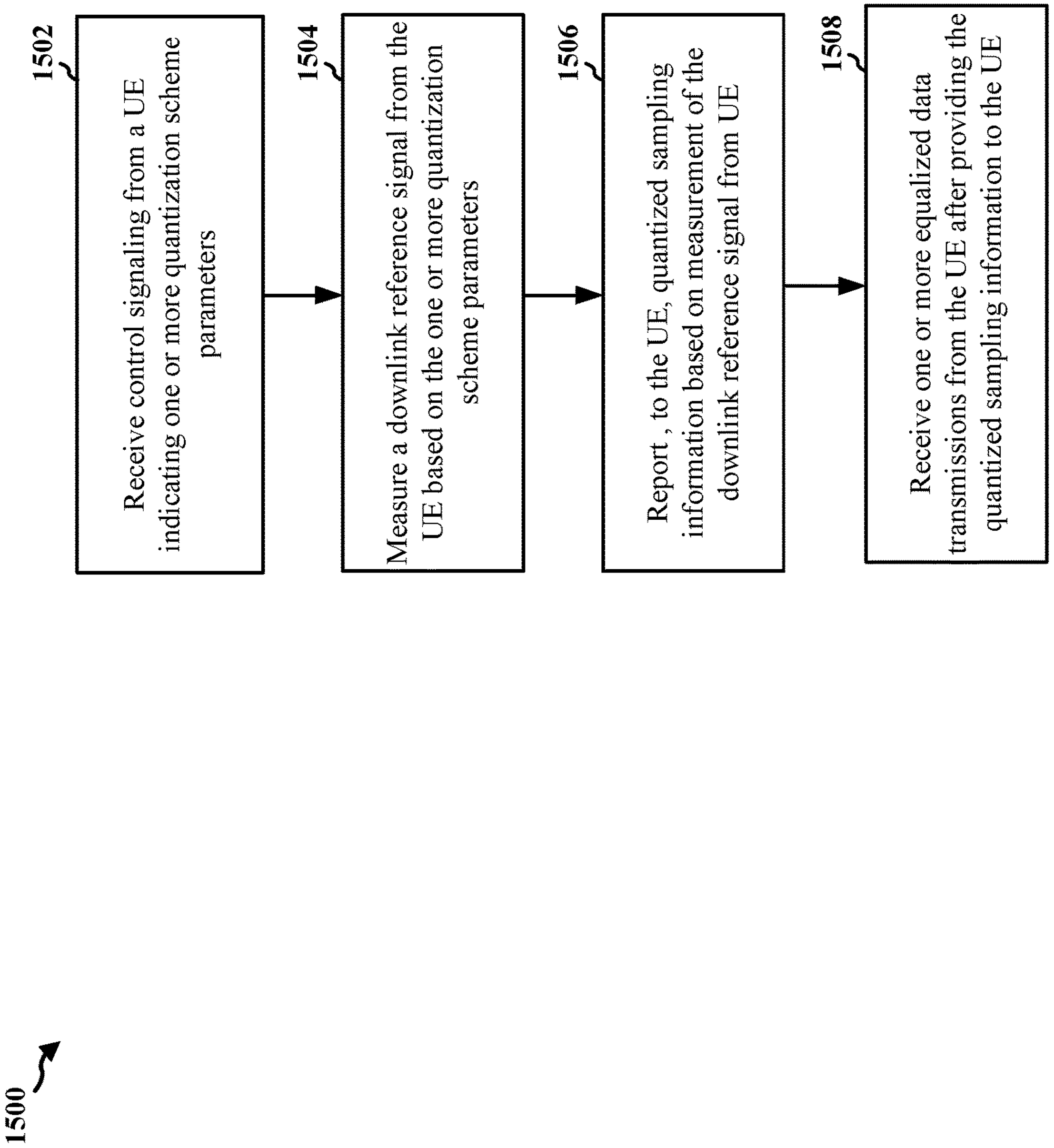
FIG. 15 is a flowchart of a method of wireless communication at a wireless device, in accordance with various aspects of the present disclosure.

FIG. 15 is a flowchart 1500 of a method of wireless communication. The method may be performed by a wireless device (e.g., the XR device 106, 350, 902, 952, 1002, 1102, 1304, 1402; the apparatus 1704). The wireless device may support transmission and reception of communication, such as XR communication, with a network via a UE. In some aspects, the wireless device may be referred to as an XR device. For example, aspects of the method may be performed by the quantization component 199, e.g., as described in connection with FIG. 1 and/or FIG. 17.

At 1502, the wireless device receive control signaling from a user equipment (UE) indicating one or more quantization scheme parameters. The reception may be performed by the quantization component 199 of the apparatus 1704, for example. The one or more quantization scheme parameters may include a quantization scheme. The quantization scheme may be a differential quantization scheme or a non-differential quantization scheme, for example. The one or more quantization scheme parameters may include at least one of a downlink reference signal allocation or a downlink reference signal density in a frequency domain. The one or more quantization scheme parameters may include an uplink resource size for reporting the quantized sampling information. The one or more quantization scheme parameters may include a downlink reference signal sample and a report rate. The control signaling may include an index to a defined or previously configured configuration that includes the one or more quantization scheme parameters. The control signaling may include at least one of a MAC-CE or DCI.

At 1504, the wireless device measures a downlink reference signal from the UE based on the one or more quantization scheme parameters. The measurement may be performed by the quantization component 199 of the apparatus 1704, for example. The one or more quantization scheme parameters may include at least one of a downlink reference signal allocation or a downlink reference signal density in a frequency domain, and at 1504, the wireless device may measure the downlink reference signal is based on the at least one of the downlink reference signal allocation or the downlink reference signal density.

At 1505, the wireless device reports, to the UE, quantized sampling information based on measurement of the downlink reference signal from the UE. The report may be performed by the quantization component 199 of the apparatus 1704, for example. The one or more quantization scheme parameters may include an uplink resource size for reporting the quantized sampling information, and the quantized sampling information may be reported, at 1506 in an uplink message having the uplink resource size. The one or more quantization scheme parameters may include a downlink reference signal sample and a report rate, and the quantized sampling information may be reported to the UE based on the downlink reference signal sample and the report rate. The one or more quantization scheme parameters may indicate resources in at least one of time and frequency for the downlink reference signal and for an uplink message to carry a report of the quantized sampling information.

At 1508, the wireless device receives one or more equalized data transmissions from the UE after providing the quantized sampling information to the UE. The reception may be performed by the quantization component 199 of the apparatus 1704, for example. The one or more equalized data transmissions may be equalized based on the quantized sampling information provided to the UE. The one or more equalized data transmissions include extended reality (XR) data.

In some aspects, the wireless device may further receive, from the UE, an update of the one or more quantization scheme parameters; and adjust the measurement of the downlink reference signal or a report of the quantized sampling information based on the update of the one or more quantization scheme parameters. In some aspects, the wireless device may update a display at the wireless device based on the one or more equalized data transmissions. In some aspects, the wireless device may further provide sensor data to the UE for transmission to an XR service via a wireless network, wherein the one or more equalized data transmissions are in response to the sensor data.

Figure 16:
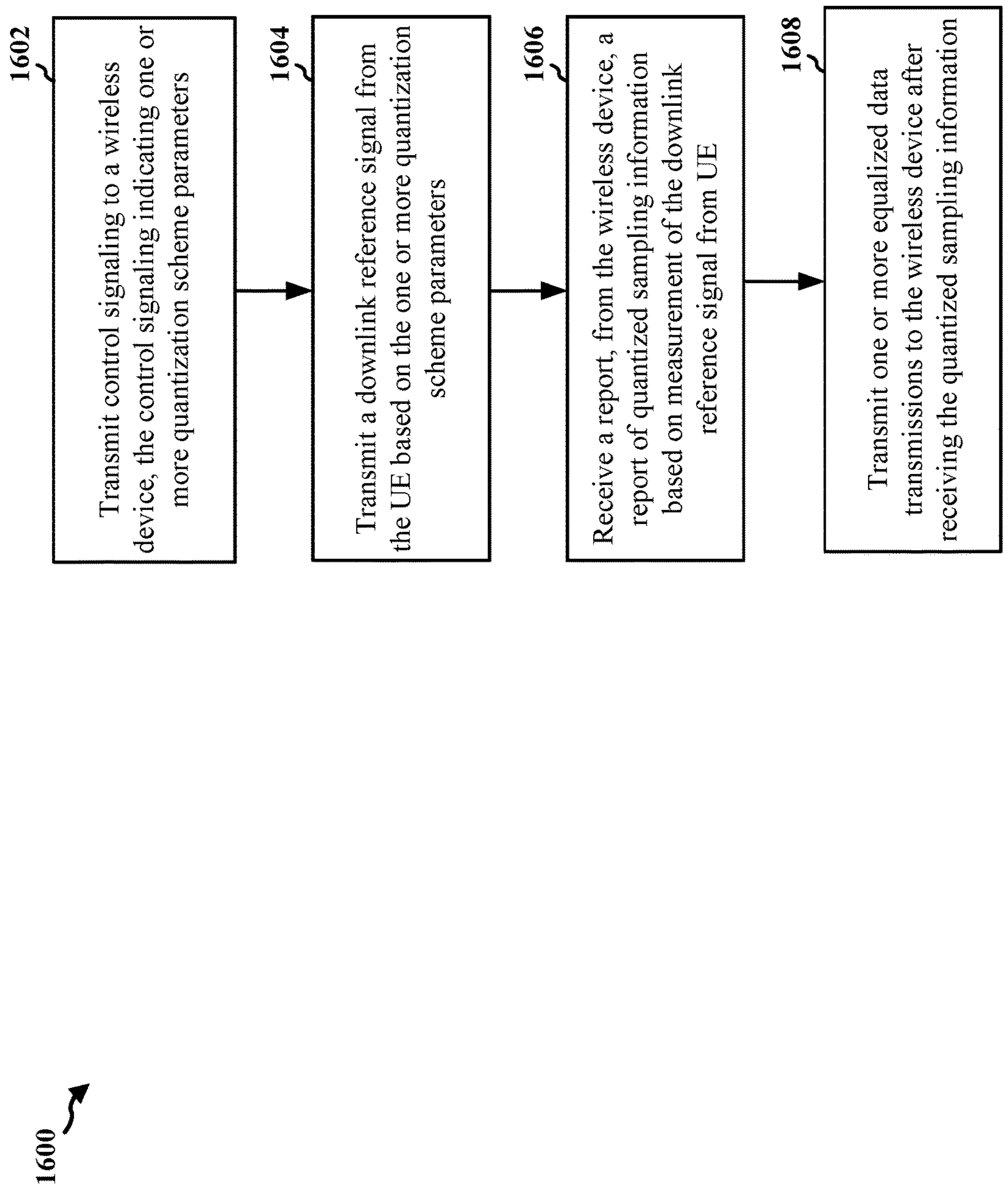
FIG. 16 is a flowchart of a method of wireless communication at a UE, in accordance with various aspects of the present disclosure.

FIG. 16 is a flowchart 1600 of a method of wireless communication. The method may be performed by a UE (e.g., the UE 104; the UE 310; the apparatus 1804). For example, aspects of the method may be performed by the pre-equalization component 198 described in connection with FIG. 1 and/or FIG. 18.

At 1602, the UE transmits control signaling to a wireless device, the control signaling indicating one or more quantization scheme parameters. The transmission may be performed, e.g., by the pre-equalization component 198 in FIG. 18, for example. The one or more quantization scheme parameters may be based on at least one of a signal to noise ratio (SNR) or a channel characteristic. The one or more quantization scheme parameters may include at least one of a downlink reference signal allocation or a downlink reference signal density in a frequency domain. The one or more quantization scheme parameters may include an uplink resource size for reporting the quantized sampling information. The one or more quantization scheme parameters may include a downlink reference signal sample and a report rate. The one or more quantization scheme parameters may include a quantization scheme. The quantization scheme may include a differential quantization scheme or a non-differential quantization scheme, for example. The one or more quantization scheme parameters may indicate resources in at least one of time and frequency for the downlink reference signal and for an uplink message to carry the report of the quantized sampling information. The control signaling may include an index to a defined or previously configured configuration that includes the one or more quantization scheme parameters. The control signaling may include at least one of a MAC-CE or DCI.

At 1604, the UE transmits a downlink reference signal based on the one or more quantization scheme parameters. The transmission may be performed, e.g., by the pre-equalization component 198 in FIG. 18, for example. The one or more quantization scheme parameters may include at least one of a downlink reference signal allocation or a downlink reference signal density in a frequency domain, and the downlink reference signal may be transmitted, at 1604, based on the at least one of the downlink reference signal allocation or the downlink reference signal density.

At 1606, the UE receives a report, from the wireless device, of quantized sampling information based on measurement of the downlink reference signal. The reception may be performed, e.g., by the pre-equalization component 198 in FIG. 18, for example. The one or more quantization scheme parameters may include an uplink resource size for reporting the quantized sampling information, and the report of the quantized sampling information may be in an uplink message having the uplink resource size. The one or more quantization scheme parameters may include a downlink reference signal sample and a report rate, where the report of the quantized sampling information is based on the downlink reference signal sample and the report rate. The one or more quantization scheme parameters may indicate resources in at least one of time and frequency for the downlink reference signal and for an uplink message to carry the report of the quantized sampling information.

At 1608, the UE transmits one or more equalized data transmissions to the wireless device after receiving the quantized sampling information. The transmission may be performed, e.g., by the pre-equalization component 198 in FIG. 18, for example. In some aspects, the UE may further equalize the one or more data transmissions based on the quantized sampling information received from the wireless device to provide the equalized one or more data transmissions.

In some aspects, the one or more equalized data transmissions may include XR data. In some aspects, the UE may further receive sensor data from the wireless device, transmit the sensor data via wireless network an XR service; receive data in response to the sensor data; and equalize the data, based on the report of the quantized sampling information, prior to transmitting the one or more equalized data transmissions to the wireless device In some aspects, the UE may further transmit, to the wireless device, an update of the one or more quantization scheme parameters based on the report; receive an additional report of the quantized sampling information based on the update of the one or more quantization scheme parameters; and adjust equalization for an additional data transmission based on the additional report of the quantized sampling information.

Figure 17:
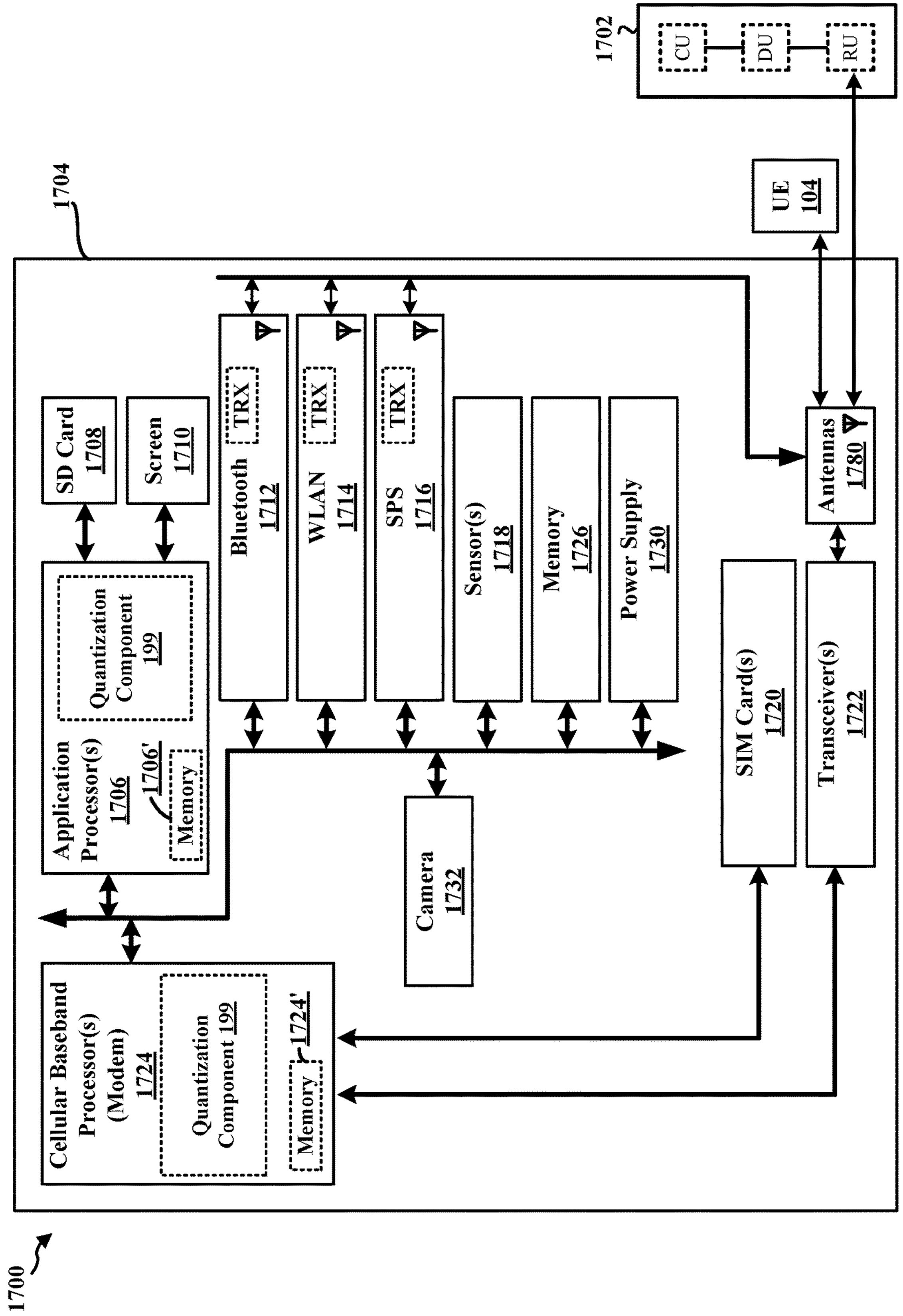
FIG. 17 is a diagram illustrating an example of a hardware implementation for an example apparatus and/or wireless device, in accordance with various aspects of the present disclosure.

FIG. 17 is a diagram 1700 illustrating an example of a hardware implementation for an apparatus 1704. The apparatus 1704 may be a wireless device or a component of a wireless device, or may implement wireless device functionality. In some aspects, the wireless device may support XR traffic, or may be referred to as an XR device. Tas an example, the apparatus may correspond to the XR device 106, 350, 902, 952, 1002, 1102, 1304, 1402, among other examples of an XR device. In some aspects, the apparatus 1704 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The cellular baseband processor(s) 1724 and the application processor(s) 1706 are configured to perform the various functions described supra based at least in part of the information stored in the memory. That is, the cellular baseband processor(s) 1724 and the application processor(s) 1706 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1724/application processor(s) 1706 when executing software. The cellular baseband processor (s) 1724/application processor(s) 1706 may be a component of the XR device 350 and may include the at least one memory 360 and/or at least one of the TX processor 368, the RX processor 356, and the controller/processor 359. In one configuration, the apparatus 1704 may be at least one processor chip (modem and/or application) and include just the cellular baseband processor(s) 1724 and/or the application processor(s) 1706, and in another configuration, the apparatus 1704 may be the entire XR device (e.g., see XR device 350 of FIG. 3) and include the additional modules of the apparatus 1704.

As discussed supra, the quantization component 199 may be configured to receive control signaling from a UE indicating one or more quantization scheme parameters; measure a downlink reference signal from the UE based on the one or more quantization scheme parameters; report, to the UE, quantized sampling information based on measurement of the downlink reference signal from UE; and receive one or more equalized data transmissions from the UE after providing the quantized sampling information to the UE. The quantization component 199 may be further configured to receive, from the UE, an update of the one or more quantization scheme parameters and adjust the measurement of the downlink reference signal or a report of the quantized sampling information based on the update of the one or more quantization scheme parameters. The quantization component 199 may be further configured to update a display at the wireless device based on the one or more equalized data transmissions. The quantization component 199 may be further configured to provide sensor data to the UE for transmission to an XR service via a wireless network, wherein the one or more equalized data transmissions are in response to the sensor data. The quantization component 199 may be further configured to perform any of the aspects described in the flowchart of FIG. 15 and/or performed by the XR device in FIG. 13 or FIG. 14. The quantization component 199 may be within the cellular baseband processor(s) 1724, the application processor(s) 1706, or both the cellular baseband processor(s) 1724 and the application processor(s) 1706. The quantization component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for receiving control signaling from a UE indicating one or more quantization scheme parameters; means for measuring a downlink reference signal from the UE based on the one or more quantization scheme parameters; means for reporting, to the UE, quantized sampling information based on measurement of the downlink reference signal from UE; and means for receiving one or more equalized data transmissions from the UE after providing the quantized sampling information to the UE. The apparatus may further include means for receiving, from the UE, an update of the one or more quantization scheme parameters; and means for adjusting the measurement of the downlink reference signal or a report of the quantized sampling information based on the update of the one or more quantization scheme parameters. The apparatus may further include means for updating a display at the wireless device based on the one or more equalized data transmissions. The apparatus may further include means for providing sensor data to the UE for transmission to an XR service via a wireless network, wherein the one or more equalized data transmissions are in response to the sensor data. The apparatus may further include means for performing any of the aspects described in the flowchart of FIG. 15 and/or performed by the XR device in FIG. 13 or FIG. 14. The means may be the quantization component 199 of the apparatus 1704 configured to perform the functions recited by the means. In some aspects, the wireless device may include a TX processor, RX processor, and controller/processor similar to those described for the XR device 350 in FIG. 3 (e.g., similar to TX processor 368, the RX processor 356, and the controller/processor 359). As such, in one configuration, the means may be the TX processor, the RX processor, and/or the controller/processor configured to perform the functions recited by the means.

Figure 18:
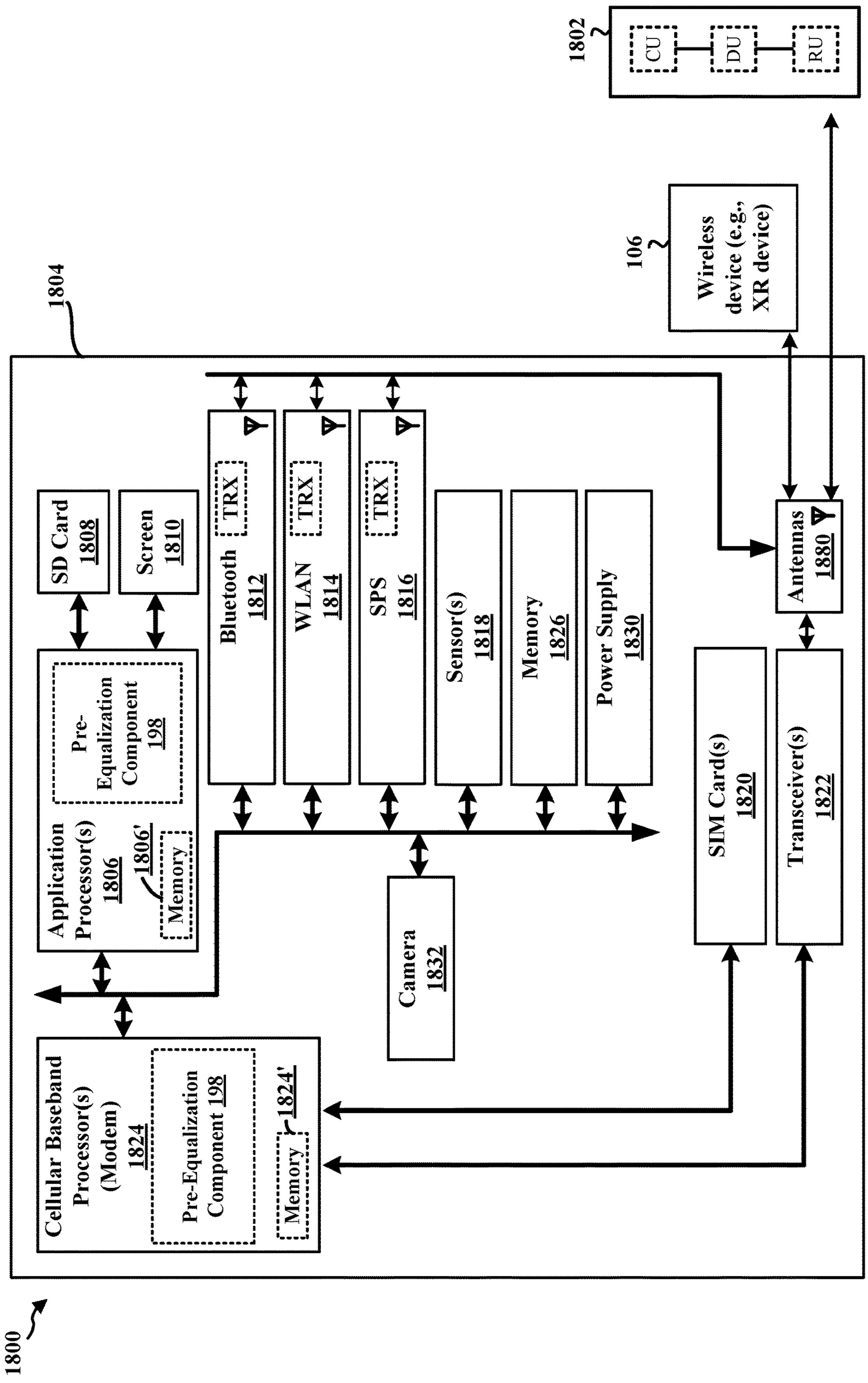
FIG. 18 is a diagram illustrating an example of a hardware implementation for an example apparatus and/or UE, in accordance with various aspects of the present disclosure.

FIG. 18 is a diagram 1800 illustrating an example of a hardware implementation for an apparatus 1804. The apparatus 1804 may be a UE, a component of a UE, or may implement UE functionality. For example, the apparatus may be the UE 104, 310, 904, 954, 1104, 1302, 1404 or the companion device 808, 1004. In some aspects, the apparatus 1804 may include at least one cellular baseband processor 1824 (also referred to as a modem) coupled to one or more transceivers 1822 (e.g., cellular RF transceiver). The cellular baseband processor(s) 1824 may include at least one on-chip memory 1824'. In some aspects, the apparatus 1804 may further include one or more subscriber identity modules (SIM) cards 1820 and at least one application processor 1806 coupled to a secure digital (SD) card 1808 and a screen 1810. The application processor(s) 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor(s) 1824 communicates through the transceiver(s) 1822 via one or more antennas 1880 with the UE 104 and/or with an RU associated with a network entity 1802. The cellular baseband processor(s) 1824 and the application processor(s) 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor(s) 1824 and the application processor(s) 1806 are each responsible for general processing, including the execution of software stored on the computer-readable medium/memory. The software, when executed by the cellular baseband processor(s) 1824/application processor(s) 1806, causes the cellular baseband processor(s) 1824/application processor(s) 1806 to perform the various functions described supra. The cellular baseband processor(s) 1824 and the application processor(s) 1806 are configured to perform the various functions described supra based at least in part of the information stored in the memory. That is, the cellular baseband processor(s) 1824 and the application processor(s) 1806 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1824/application processor(s) 1806 when executing software. The cellular baseband processor(s) 1824/application processor(s) 1806 may be a component of the UE 310 and may include the at least one memory 376 and/or at least one of the TX processor 316, the RX processor 370, and the controller/processor 375. In one configuration, the apparatus 1804 may be at least one processor chip (modem and/or application) and include just the cellular baseband processor(s) 1824 and/or the application processor(s) 1806, and in another configuration, the apparatus 1804 may be the entire UE (e.g., see UE 310 of FIG. 3) and include the additional modules of the apparatus 1804.

As discussed supra, the pre-equalization component 198 may be configured to transmit control signaling to a wireless device, the control signaling indicating one or more quantization scheme parameters; transmit a downlink reference signal based on the one or more quantization scheme parameters; receive a report, from the wireless device, of quantized sampling information based on measurement of the downlink reference signal; and transmit one or more equalized data transmissions to the wireless device after receiving the quantized sampling information. The pre-equalization component 198 may be further configured to equalize the one or more data transmissions based on the quantized sampling information received from the wireless device to provide the equalized one or more data transmissions. The pre-equalization component 198 may be further configured to transmit, to the wireless device, an update of the one or more quantization scheme parameters based on the report; receive an additional report of the quantized sampling information based on the update of the one or more quantization scheme parameters; and adjust equalization for an additional data transmission based on the additional report of the quantized sampling information. The pre-equalization component 198 may be further configured to receive sensor data from the wireless device; transmit the sensor data via wireless network an XR service; receive data in response to the sensor data; and equalize the data, based on the report of the quantized sampling information, prior to transmitting the one or more equalized data transmissions to the wireless device. The pre-equalization component 198 may be further configured to perform any of the aspects described in the flowchart in FIG. 16 and/or performed by the UE device in FIG. 13 or FIG. 14. The pre-equalization component 198 may be within the cellular baseband processor(s) 1824, the application processor(s) 1806, or both the cellular baseband processor(s) 1824 and the application processor(s) 1806. The pre-equalization component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1804 may include a variety of components configured for various functions. In one configuration, the apparatus 1804, and in particular the cellular baseband processor(s) 1824 and/or the application processor(s) 1806, may include means for transmitting control signaling to a wireless device, the control signaling indicating one or more quantization scheme parameters; means for transmitting a downlink reference signal based on the one or more quantization scheme parameters; means for receiving a report, from the wireless device, of quantized sampling information based on measurement of the downlink reference signal; and means for transmitting one or more equalized data transmissions to the wireless device after receiving the quantized sampling information. The apparatus may further include means for equalizing the one or more data transmissions based on the quantized sampling information received from the wireless device to provide the equalized one or more data transmissions. The apparatus may further include means for transmitting, to the wireless device, an update of the one or more quantization scheme parameters based on the report; means for receiving an additional report of the quantized sampling information based on the update of the one or more quantization scheme parameters; and means for adjusting equalization for an additional data transmission based on the additional report of the quantized sampling information. The apparatus may further include means for receiving sensor data from the wireless device; means for transmitting the sensor data via wireless network an XR service; means for receiving data in response to the sensor data; and means for equalizing the data, based on the report of the quantized sampling information, prior to transmitting the one or more equalized data transmissions to the wireless device. The apparatus may further include means for performing any of the aspects described in the flowchart of FIG. 16 and/or performed by the UE device in FIG. 13 or FIG. 14. The means may be the pre-equalization component 198 of the apparatus 1804 configured to perform the functions recited by the means. As described supra, the apparatus 1804 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including: receiving control signaling from a user equipment (UE) indicating one or more quantization scheme parameters; measuring a downlink reference signal from the UE based on the one or more quantization scheme parameters; reporting, to the UE, quantized sampling information based on measurement of the downlink reference signal from the UE; and receiving one or more equalized data transmissions from the UE after providing the quantized sampling information to the UE.

Aspect 2 is the method of aspect 1, further including that the one or more equalized data transmissions are equalized based on the quantized sampling information provided to the UE.

Aspect 3 is the method of any of aspects 1 and 2, further including that the one or more quantization scheme parameters include at least one of a downlink reference signal allocation or a downlink reference signal density in a frequency domain, and where measuring the downlink reference signal is based on at least one of the downlink reference signal allocation or the downlink reference signal density.

Aspect 4 is the method of any of aspects 1 to 3, further including that the one or more quantization scheme parameters include an uplink resource size for reporting the quantized sampling information, and where the quantized sampling information is reported in an uplink message having the uplink resource size.

Aspect 5 is the method of any of aspects 1 to 4, further including that the one or more quantization scheme parameters include a downlink reference signal sample and a report rate, and where the quantized sampling information is reported to the UE based on the downlink reference signal sample and the report rate.

Aspect 6 is the method of any of aspects 1 to 5, further including that the one or more quantization scheme parameters include a quantization scheme.

Aspect 7 is the method of any of aspects 1 to 6, further including that the quantization scheme is a differential quantization scheme or a non-differential quantization scheme.

Aspect 8 is the method of any of aspects 1 to 7, further including that the one or more quantization scheme parameters indicate resources in at least one of time and frequency for the downlink reference signal and for an uplink message to carry the report of the quantized sampling information.

Aspect 9 is the method of any of aspects 1 to 8, further including: receiving, from the UE, an update of the one or more quantization scheme parameters; and adjusting the measurement of the downlink reference signal or the report of the quantized sampling information based on the update of the one or more quantization scheme parameters.

Aspect 10 is the method of any of aspects 1 to 9, further including that the control signaling includes an index to a defined or previously configured configuration that includes the one or more quantization scheme parameters.

Aspect 11 is the method of any of aspects 1 to 10, further including that the control signaling includes at least one of a medium access control-control element (MAC-CE) or downlink control information (DCI).

Aspect 12 is the method of any of aspects 1 to 11, further including that the one or more equalized data transmissions include extended reality (XR) data.

Aspect 13 is the method of any of aspects 1 to 12, further including: updating a display at the wireless device based on the one or more equalized data transmissions.

Aspect 14 is the method of any of aspects 1 to 13, further including: providing sensor data to the UE for transmission to an XR service via a wireless network, where the one or more equalized data transmissions are in response to the sensor data.

Aspect 15 is an apparatus for wireless communication at a wireless device including at least one processor coupled to a memory and configured to implement any of aspects 1 to 14.

In aspect 16, the apparatus of aspect 15 further includes at least one antenna coupled to the at least one processor.

In aspect 17, the apparatus of aspect 15 or 16 further includes a transceiver coupled to the at least one processor.

Aspect 18 is an apparatus for wireless communication including means for implementing any of aspects 1 to 14.

In aspect 19, the apparatus of aspect 18 further includes at least one antenna coupled to the means to perform the method of any of aspects 1 to 14.

In aspect 20, the apparatus of aspect 18 or 19 further includes a transceiver coupled to the means to perform the method of any of aspects 1 to 14.

Aspect 21 is a non-transitory computer-readable storage medium storing computer executable code, where the code, when executed, causes a processor to implement any of aspects 1 to 14.

Aspect 22 is a method of wireless communication at a UE, including: transmitting control signaling to a wireless device, the control signaling indicating one or more quantization scheme parameters; transmitting a downlink reference signal based on the one or more quantization scheme parameters; receiving a report, from the wireless device, of quantized sampling information based on measurement of the downlink reference signal; and transmitting one or more equalized data transmissions to the wireless device after receiving the quantized sampling information.

Aspect 23 is the method of aspect 22, further including: equalizing, based on the quantized sampling information received from the wireless device, one or more data transmissions to provide the one or more equalized data transmissions.

Aspect 24 is the method of any of aspects 22 and 23, further including that the one or more quantization scheme parameters are based on at least one of a signal to noise ratio (SNR) or a channel characteristic.

Aspect 25 is the method of any of aspects 22 to 24, further including that the one or more quantization scheme parameters include at least one of a downlink reference signal allocation or a downlink reference signal density in a frequency domain, and where transmitting the downlink reference signal includes transmitting the downlink reference signal based on at least one of the downlink reference signal allocation or the downlink reference signal density.

Aspect 26 is the method of any of aspects 22 to 25, further including that the one or more quantization scheme parameters include an uplink resource size for reporting the quantized sampling information, where the report of the quantized sampling information is in an uplink message having the uplink resource size.

Aspect 27 is the method of any of aspects 22 to 26, further including that the one or more quantization scheme parameters include a downlink reference signal sample and a report rate, where the report of the quantized sampling information is based on the downlink reference signal sample and the report rate.

Aspect 28 is the method of any of aspects 22 to 27, further including that the one or more quantization scheme parameters include a quantization scheme.

Aspect 29 is the method of any of aspects 22 to 28, further including that the quantization scheme is a differential quantization scheme or a non-differential quantization scheme.

Aspect 30 is the method of any of aspects 22 to 29, further including that the one or more quantization scheme parameters indicate resources in at least one of time and frequency for the downlink reference signal and for an uplink message to carry the report of the quantized sampling information.

Aspect 31 is the method of any of aspects 22 to 30, further including: transmitting, to the wireless device, an update of the one or more quantization scheme parameters based on the report; receiving an additional report of the quantized sampling information based on the update of the one or more quantization scheme parameters; and adjusting equalization for an additional data transmission based on the additional report of the quantized sampling information.

Aspect 32 is the method of any of aspects 22 to 31, further including that the control signaling includes an index to a defined or previously configured configuration that includes the one or more quantization scheme parameters.

Aspect 33 is the method of any of aspects 22 to 32, further including that the control signaling includes at least one of a medium access control-control element (MAC-CE) or downlink control information (DCI).

Aspect 34 is the method of any of aspects 22 to 33, further including that the one or more equalized data transmissions include extended reality (XR) data.

Aspect 35 is the method of any of aspects 22 to 34, further including: receiving sensor data from the wireless device; transmitting the sensor data via wireless network an XR service; receiving data in response to the sensor data; and equalizing the data, based on the report of the quantized sampling information, prior to transmitting the one or more equalized data transmissions to the wireless device.

Aspect 36 is an apparatus for wireless communication at a UE including at least one processor coupled to a memory and configured to implement any of aspects 22 to 35.

In aspect 37, the apparatus of aspect 36 further includes at least one antenna coupled to the at least one processor.

In aspect 38, the apparatus of aspect 36 or 37 further includes a transceiver coupled to the at least one processor.

Aspect 39 is an apparatus for wireless communication including means for implementing any of aspects 22 to 35.

In aspect 40, the apparatus of aspect 39 further includes at least one antenna coupled to the means to perform the method of any of aspects 22 to 35.

In aspect 41, the apparatus of aspect 39 or 40 further includes a transceiver coupled to the means to perform the method of any of aspects 22 to 35.

Aspect 42 is a non-transitory computer-readable storage medium storing computer executable code, where the code, when executed, causes a processor to implement any of aspects 22 to 35.

What is claimed is:

1. An apparatus for wireless communication at a wireless device, comprising:

at least one memory; and at least one processor coupled to the at least one memory and, based at least in part on information stored in the at least one memory, the at least one processor, individually or in any combination, is configured to:

receive control signaling from a user equipment (UE) indicating one or more quantization scheme parameters for downlink reference signal measurement;

measure a downlink reference signal from the UE based on the one or more quantization scheme parameters;

report, to the UE, quantized sampling information based on measurement of the downlink reference signal from the UE; and receive one or more equalized data transmissions from the UE after providing the quantized sampling information to the UE.

2. The apparatus of claim 1, wherein the one or more equalized data transmissions are equalized based on the quantized sampling information provided to the UE.

3. The apparatus of claim 1, wherein the one or more quantization scheme parameters include at least one of a downlink reference signal allocation or a downlink reference signal density in a frequency domain, and wherein the at least one processor is further configured to:

measure the downlink reference signal based on at least one of the downlink reference signal allocation or the downlink reference signal density.

4. The apparatus of claim 1, wherein the one or more quantization scheme parameters include an uplink resource size for reporting the quantized sampling information, and wherein the at least one processor is further configured to:

report the quantized sampling information in an uplink message having the uplink resource size.

5. The apparatus of claim 1, wherein the one or more quantization scheme parameters include a downlink reference signal sample and a report rate, and wherein the at least one processor is further configured to:

report the quantized sampling information to the UE based on the downlink reference signal sample and the report rate.

6. The apparatus of claim 1, wherein the one or more quantization scheme parameters include a quantization scheme.

7. The apparatus of claim 6, wherein the quantization scheme is a differential quantization scheme or a non-differential quantization scheme.

8. The apparatus of claim 1, wherein the one or more quantization scheme parameters indicate resources in at least one of time and frequency for the downlink reference signal and for an uplink message to carry the report of the quantized sampling information.

9. The apparatus of claim 1, wherein the at least one processor is further configured to:

receive, from the UE, an update of the one or more quantization scheme parameters; and adjust the measurement of the downlink reference signal or the report of the quantized sampling information based on the update of the one or more quantization scheme parameters.

10. The apparatus of claim 1, wherein the control signaling includes an index to a defined or previously configured configuration that includes the one or more quantization scheme parameters.

11. The apparatus of claim 1, wherein the control signaling includes at least one of a medium access control-control element (MAC-CE) or downlink control information (DCI).

12. The apparatus of claim 1, wherein the one or more equalized data transmissions include extended reality (XR) data.

13. The apparatus of claim 12, wherein the at least one processor is further configured to:

update a display at the wireless device based on the one or more equalized data transmissions.

14. The apparatus of claim 13, wherein the at least one processor is further configured to:

provide sensor data to the UE for transmission to an XR service via a wireless network, wherein the one or more equalized data transmissions are in response to the sensor data.

15. The apparatus of claim 1, further comprising a transceiver coupled to the at least one processor, the transceiver being configured to receive the control signaling from the UE, measure the downlink reference signal from the UE, report the quantized sampling information, and receive the one or more equalized data transmissions from the UE.

16. An apparatus for wireless communication at a user equipment (UE), comprising:

at least one memory; and at least one processor coupled to the at least one memory and, based at least in part on information stored in the at least one memory, the at least one processor, is configured to:

transmit control signaling to a wireless device, the control signaling indicating one or more quantization scheme parameters for downlink reference signal measurement;

transmit a downlink reference signal based on the one or more quantization scheme parameters;

receive a report, from the wireless device, of quantized sampling information based on measurement of the downlink reference signal; and transmit one or more equalized data transmissions to the wireless device after receiving the quantized sampling information.

17. The apparatus of claim 16, wherein the at least one processor is further configured to:

equalize, based on the quantized sampling information received from the wireless device, one or more data transmissions to provide the one or more equalized data transmissions.

18. The apparatus of claim 16, wherein the one or more quantization scheme parameters are based on at least one of a signal to noise ratio (SNR) or a channel characteristic.

19. The apparatus of claim 16, wherein the one or more quantization scheme parameters include at least one of a downlink reference signal allocation or a downlink reference signal density in a frequency domain, and wherein to transmit the downlink reference signal, the at least one processor is further configured to:

transmit the downlink reference signal based on at least one of the downlink reference signal allocation or the downlink reference signal density.

20. The apparatus of claim 16, wherein the one or more quantization scheme parameters include an uplink resource size for reporting the quantized sampling information, wherein the report of the quantized sampling information is in an uplink message having the uplink resource size.

21. The apparatus of claim 16, wherein the one or more quantization scheme parameters include a downlink reference signal sample and a report rate, wherein the report of the quantized sampling information is based on the downlink reference signal sample and the report rate.

22. The apparatus of claim 16, wherein the one or more quantization scheme parameters include a quantization scheme.

23. The apparatus of claim 22, wherein the quantization scheme is a differential quantization scheme or a non-differential quantization scheme.

24. The apparatus of claim 16, wherein the one or more quantization scheme parameters indicate resources in at least one of time and frequency for the downlink reference signal and for an uplink message to carry the report of the quantized sampling information.

25. The apparatus of claim 16, wherein the at least one processor is further configured to:

transmit, to the wireless device, an update of the one or more quantization scheme parameters based on the report;

receive an additional report of the quantized sampling information based on the update of the one or more quantization scheme parameters; and adjust equalization for an additional data transmission based on the additional report of the quantized sampling information.

26. The apparatus of claim 16, wherein the control signaling includes an index to a defined or previously configured configuration that includes the one or more quantization scheme parameters.

27. The apparatus of claim 16, wherein the control signaling includes at least one of a medium access control-control element (MAC-CE) or downlink control information (DCI).

28. The apparatus of claim 16, wherein the one or more equalized data transmissions include extended reality (XR) data.

29. The apparatus of claim 28, wherein the at least one processor is further configured to:

receive sensor data from the wireless device;

transmit the sensor data via wireless network an XR service;

receive data in response to the sensor data; and equalize the data, based on the report of the quantized sampling information, prior to transmitting the one or more equalized data transmissions to the wireless device.

30. The apparatus of claim 16, further comprising a transceiver coupled to the at least one processor, the transceiver being configured to transmit the control signaling to the wireless device, transmit the downlink reference signal based on the one or more quantization scheme parameters, receive the report of the quantized sampling information, and transmit the one or more equalized data transmissions to the wireless device after receiving the quantized sampling information.

* * * * *